United States Patent [19]

Yabusaki

[11] Patent Number: 5,619,734
[45] Date of Patent: Apr. 8, 1997

[54] PROGRAMMABLE CONTROLLER AND METHOD OF OPERATION THEREOF

[75] Inventor: Tatsumi Yabusaki, Aichi, Japan

[73] Assignee: Mitsubishi Denki Kabushiki Kaisha, Tokyo, Japan

[21] Appl. No.: 221,759

[22] Filed: Apr. 1, 1994

[30] Foreign Application Priority Data

Apr. 1, 1993 [JP] Japan .................................. 5-075825

[51] Int. Cl.$^6$ .................................................. G06F 13/00
[52] U.S. Cl. .......................... 395/882; 395/828; 395/884
[58] Field of Search .................................... 364/900, 474; 395/828, 882, 884

[56] References Cited

U.S. PATENT DOCUMENTS

| | | | |
|---|---|---|---|
| 3,976,980 | 8/1976 | Hertz | 340/172.5 |
| 4,245,300 | 1/1981 | Kaufman et al. | 364/200 |
| 4,972,365 | 11/1990 | Dodds et al. | 364/900 |
| 5,418,729 | 5/1995 | Holmes et al. | 364/474.09 |
| 5,488,409 | 1/1996 | Yuen et al. | 348/5 |

FOREIGN PATENT DOCUMENTS

| | | |
|---|---|---|
| 0030463 | 12/1980 | European Pat. Off. . |
| 0088982 | 3/1983 | European Pat. Off. . |
| 2139384 | 4/1983 | United Kingdom . |
| 2230120 | 2/1990 | United Kingdom . |

*Primary Examiner*—Jack B. Harvey
*Assistant Examiner*—John Travis
*Attorney, Agent, or Firm*—Sughrue, Mion, Zinn, Macpeak & Seas

[57] ABSTRACT

A programmable controller apparatus, and a method for operating a programmable controller apparatus, which does not require a sequence program to initialize the device memory at the start of operation of the programmable controller apparatus. Further, the apparatus and method both allow the contents of the device memory of the programmable controller to be changed at a specified time, during a simulation operation, or when data at a predetermined address of the device memory represents a predetermined value. The programmable controller operates based on the contents of the device memory, and comprises a second memory for sequentially storing data including address data indicating a first address of the device memory and write data to be written to a predetermined number of addresses of the device memory beginning at the first address, and a memory changing device for changing the contents of the device memory in accordance with the data stored in the second memory. The memory changing device changes the contents of the device memory when operation of the programmable controller begins, at a predetermined time, or when a predetermined address of the device memory represents a predetermined value.

30 Claims, 21 Drawing Sheets

PROGRAMMABLE CONTROLLER AND METHOD OF OPERATION THEREOF

BACKGROUND OF THE INVENTION

1. Field of the Invention

The present invention relates to a programmable controller and a programmable controller operating method which facilitates initialization or intentional changing of internal data.

2. Description of the Related Art

FIG. 21 is a block diagram of a conventional programmable controller. A programmable controller unit 1 comprises a CPU 3 for performing arithmetic operations and processing to exercise internal control of the programmable controller unit 1. An input/output device 2, such as peripheral equipment or the like, performs several functions such as writing a sequence program and monitoring the internal status of the CPU module 3, along with performing other operations.

Programmable controller unit 1 further comprises a peripheral equipment interface 4, for coupling the programmable controller unit 1 to the input/output device via communication cable 4a. Peripheral equipment interface 4 operates to match the internal signal of the programmable controller unit 1 with a signal transmitted on the communication cable. Programmable controller unit 1 further comprises input/output port 5, system program memory 6 having a system program stored therein for operating the CPU 3, and sequence program memory 7 having sequence programs stored therein. The programmable controller unit 1 repeatedly executes the sequence programs; stored in the sequence memory 7.

Programmable controller unit 1 further comprises a first storage device 12, for example, a device memory for storing internal data. The device memory 12 comprises input device memory 8, for storing the states of input signals entered via the input/output port 5, output device memory 9, for storing the states of output signals output via the input/output port 5, internal device memory 10, for storing data indicating the results of arithmetic operations performed under the control of the sequence program, and peripheral equipment device memory 11, which is needed to perform a simulation operation which will be described later.

Operation of the programmable controller unit 1 will now be described.

The sequence program stored in the sequence program memory 7 is designed to change its operation according to the contents, etc., of the input device memory 8 and the internal device memory 10. Hence, prior to the start of sequence program execution, the contents of the device memory 12 must be initialized. The programmable controller 1 repeats the execution of a sequence program to perform operations as shown in FIG. 22.

When an operation start condition occurs at a power-on condition or the like, processing progresses from start step S601 to step S602, where the state of the input signal is obtained from the input/output port 5 and stored in the input device memory 8, and then advances to step S603.

In step S603, a sequence program for initializing the device memory 12 is run and processing moves to step S604. This initialization sequence is designed to initialize the device memory 12 only when the sequence program is being run the first time after start of operation.

FIG. 23 shows an example of a sequence program, such as a ladder program or the like, for performing initialization.

Initialization sequence program 2301 is designed to transfer the contents of memory K100–K106 to addresses D0–D6 of internal device memory 10 when the data of an internal device M9038, or data at the predetermined address of the internal device memory 10, is set to "1" (ON). After initialization, the processing proceeds to step S604 as shown in FIG. 22.

In step S604, predetermined arithmetic operations are executed under the control of the sequence program with reference to the contents of the input device memory 8, the internal device memory 10, etc., and the arithmetic operation results are stored in the internal device memory 10 or the output device memory 9, and the processing advances to step S605. In step S605, the content of the output device memory 9 is output from the input/output port 5 and execution proceeds to step S606.

In step S606, if a processing request is provided by peripheral equipment 2, processing in response to that request is performed and processing moves to step S607. In step S607, it is determined whether an end request is provided by, for example, the peripheral equipment. If an end request is provided, the processing proceeds to end step S608, and the processing is terminated. However, if no end request is provided, the processing returns to step S601 and is repeated.

In accordance with the processing described above, it should be noted that the content of the input device memory 8 is changed according to the state of the input signal from the input/output device 2, and the contents of the output device memory 9 and the internal device memory 10 are changed according to the arithmetic operation results obtained in accordance with the sequence program. Also, the sequence program for initializing the device memory 12 as described above is designed to always run in a single cycle of the sequence program regardless of whether or not it actually performs initialization. This creates a problem, because as the number of steps in, the initialization sequence program increases, the time needed to execute a cycle of the sequence program increases.

In the conventional art, an operation method exists which is known as a simulation operation, wherein the contents of the input device memory 8, the output device memory 9 or the internal device memory 10 are intentionally changed. This operation method is used for program debugging or the like.

According to this simulation operation, during operation of the programmable controller unit 1, when the input/output device 2 provides a change request indicating that a portion of the device memory 12 is to be changed, and the peripheral equipment 2 provides instructions indicating the way in which that portion is to be changed, the programmable controller unit 1 can operate with the memory contents being changed as requested.

For example, when a external lamp is to be lit temporarily, an operator controls the input/output device 2 (peripheral equipment) to provide the programmable controller unit 1 with a request to set "on" (e.g., to "1") the predetermined address of the device memory 12 to which the lamp is assigned, and this request is executed by the programmable controller 1 in step S606 shown in FIG. 22. The predetermined address of the device memory 12 to which the lamp is assigned exists in the output device memory 9 of the device memory 12. When the predetermined address of the device memory 12 to which the lamp is assigned is set to "on" (e.g., "1"), the programmable controller 1 lights the lamp.

As described above, the contents of the output device memory 9 and the internal device memory 10 can be changed as requested by the input/output device 2 as indicated in, for example, step S606. However, as further described above, the contents of the input device memory 8 is based on the state of the input signal obtained from the input/output port 5. Therefore, even if the content of the input device memory 8 is intentionally changed in step S606, when the processing is repeated, the content of the input memory device 8 is again changed in step S602 in accordance with the states of the input signals being provided at that time (e.g., input signals from the input/output device 2). Hence, this new data now in the input device memory 8, not the data entered in step S606 to perform the simulation operation, is used by the CPU 3 when performing the arithmetic operation in step S604.

Therefore, in order to change the contents of the input device memory 8 in, for example, step S606, and have that data used in the arithmetic operation of step S604 during a simulation operation, the contents of the peripheral equipment device memory 11 are changed without the contents of the input device memory 8 being changed. Namely, the contents of the peripheral equipment device memory 11 are zeroed as initial values (i.e., all switched off) and switched on/off upon request. Then, in the simulation operation, the CPU 3 does not read the data of the input device memory 8 alone, but rather reads the arithmetic OR of the input device memory 8 data and the peripheral equipment device memory 11 data as the data of the internal device memory 8 at the time the arithmetic operation in step S604 is performed.

That is, if the switch of the actual external equipment is off, the data of the input device memory 8 corresponding to that switch is "0". However, if the data of the peripheral equipment device memory 11 is "1", the OR value of the data in the input device memory 8 and the peripheral equipment device memory 11 is "1". This data value of "1" is read by the CPU 3 as the simulation data of the input device memory 8 during the simulation operation. Hence, even where the switch is off during step S602, thus causing the data of the input device memory 8 corresponding to that switch to be "0", the desired simulated value "1" entered in peripheral equipment device memory 11 during step S606 is used in the arithmetic operation.

As evident from the above, several disadvantages exist in the conventional programmable controller. For example, a sequence program for initialization needs to be run at the start of operation to initialize the device memory 12, and much time is required to write such sequence program. Also, to change the contents of the device memory 12 at a particular time when, for example, it is desirable to run a simulation operation or the like, a sequence program for effecting the change must be executed. Much time is required to write such a sequence program and thus, the change must be anticipated well in advance to allow ample time to complete the sequence program. Hence, it is burdensome to have the change implemented at any given time.

In addition, to change the contents of the device memory 12 during a simulation operation or the like when data at the predetermined address of the device memory 12 matches a preset value, a sequence program to effect that change must be executed. Much time is required to write that sequence program and accordingly, it is difficult to have the program completed in time to change the contents of the device memory 12 immediately when the condition occurs.

Furthermore, to intentionally change the contents of the device memory 12 several times during simulation operation or the like, an operator must input new data from the input/output (peripheral equipment) 2 and transmit it to the programmable controller 1 every time an intentional change is made.

Hence, it is often difficult to match the timing of a change, to change the contents of the device memory 12 at a plurality of addresses simultaneously, or to reproduce an input signal of short duration (e.g., 0.1 seconds or less).

SUMMARY OF THE INVENTION

Accordingly, it is an object of the present invention to overcome the above disadvantages by providing a programmable controller which does not require a sequence program to initialize the device memory at the start of operation of the controller. Another object of the present invention is to provide a programmable controller which allows the contents of the device memory 12 to be changed at specified times during a simulation operation or the like, and which does not require a sequence program to be written to accomplish such a change.

A further object of the present invention is to provide a programmable controller which allows the contents of the device memory 12 to be changed during a simulation operation or the like when data at the predetermined address of the device memory 12 matches a preset value, and which does not require a sequence program to be written to accomplish such a change. Still another object of the present invention is to provide a programmable controller which does not require an operator to input new data from the input/output device 2 (peripheral equipment) every time a change is made during a simulation operation or the like, during which, the contents of the device memory 12 are intentionally changed several times during the operation of the programmable controller.

Finally, another object of the present invention is to provide a programmable controller which ensures ease of matching the timing of a change, changing the contents of the device memory 12 at a plurality of addresses simultaneously, and reproducing the input signal of short duration (e.g., 0.1 seconds or less).

A programmable controller provided by the present invention operates in accordance with the storage contents of first storage means, which includes data indicating input/output signal states, data indicating output signal states, or predetermined internal data. The programmable controller comprises second storage means for sequentially storing address data, indicating a first address, and write data to be written to a predetermined number of addresses beginning at the first address. Also, the second storage means is designed to sequentially store a predetermined number of data sets. A data set comprises the address data and write data to be written to an address indicated by the address information.

In addition, the programmable controller comprises changing means for changing the storage contents of the first storage means according to the storage contents of the second storage means at the start of operation of the programmable controller. Also, the changing means is designed to change the storage contents of the first storage means according to the storage contents of the second storage means when data stored at the predetermined address of said first storage means matches a preset value.

Further, the programmable controller includes timing means which outputs a signal representing the current time, and the changing means is also designed to change the storage contents of the first storage means according to the storage contents of the second storage means when the timing output of the timing means matches a preset time.

The present invention further provides a second embodiment of a programmable controller, which operates in accordance with the storage contents of first storage means, which includes data indicating input/output signal states, data indicating output signal states, or predetermined internal data. The second embodiment's programmable controller comprises second storage means for sequentially storing a predetermined number of data blocks. One data block comprises a predetermined number of data sets. One data set comprises address data indicating a first address and write data to be written to a predetermined number of addresses beginning at the first address.

The second embodiment's programmable controller further comprises changing means for reading the storage contents of the second storage means one block at a time at a predetermined cycle, and changing the storage contents of the first storage means sequentially according to the read contents. Also, the second embodiment programmable controller includes timing means which outputs a current time.

The changing means also operates to read the storage contents of the second storage means one block at a time, and changes the storage contents of the first storage means according to contents read from the second storage means when the timing output of the timing means matches any of a plurality of preset times. Further, the changing means reads the storage contents of the second storage means one block at a time and changes the storage contents of the first storage means according to the contents read from the second storage means when data stored at the predetermined address of the first storage means match any of a plurality of preset values.

The present invention further provides a method for operating a programmable controller in accordance with data indicating input/output signal states, data indicating output signal states, or predetermined internal data, stored in a first storage means. The method comprises a first step wherein address data indicating a first address and write data to be written to a predetermined number of addresses beginning at that first address are input sequentially, and a second step wherein the contents of the first storage means are changed according to the data input during said first step at the start of operation.

Also, in the first step, a predetermined number of information sets are input sequentially. One of the information sets comprises address data and write data to be written to an address indicated by the address data. Further, in the second step, the storage contents of the first storage means are changed according to the data input in the first step when it is determined that the current time matches a predetermined time.

In addition, in the second step, the storage contents of the first storage means are changed according to the information input in the first step when it is determined that data stored at the predetermined address of the first storage means matches a predetermined value.

The present invention further provides a second method for operating a programmable controller which operates in accordance with data indicating input/output signal states, data indicating output signal states, or predetermined internal data. The method comprises a first step wherein a plurality of data blocks are input sequentially via input means. One of the data blocks comprises address data indicating a first address, and write data to be written to a predetermined number of addresses beginning at the first address.

The method further comprises a second step wherein the data input in the first step is read one block at a time at a predetermined cycle, and the contents of the first storage means are changed sequentially according to read contents.

Also, in the first step, a plurality of data blocks are input sequentially. One of the data blocks comprises a predetermined number of data sets. One set comprises address data and write data to be written to an address indicated by the address data.

Further, in the second step, any single block in the data input in the first step is selectively read and the storage contents of the first storage means are changed according to that read data when it is determined that the current time matches any of a plurality of predetermined times. In addition, in the second step, any single block in the data input in the first step is selectively read and the storage contents of the first storage means are changed according to the read data when it is determined that data stored at the predetermined address of the first storage means matches any of a plurality of predetermined values.

BRIEF DESCRIPTION OF THE DRAWINGS

These and other objects and advantages of the invention will become more apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
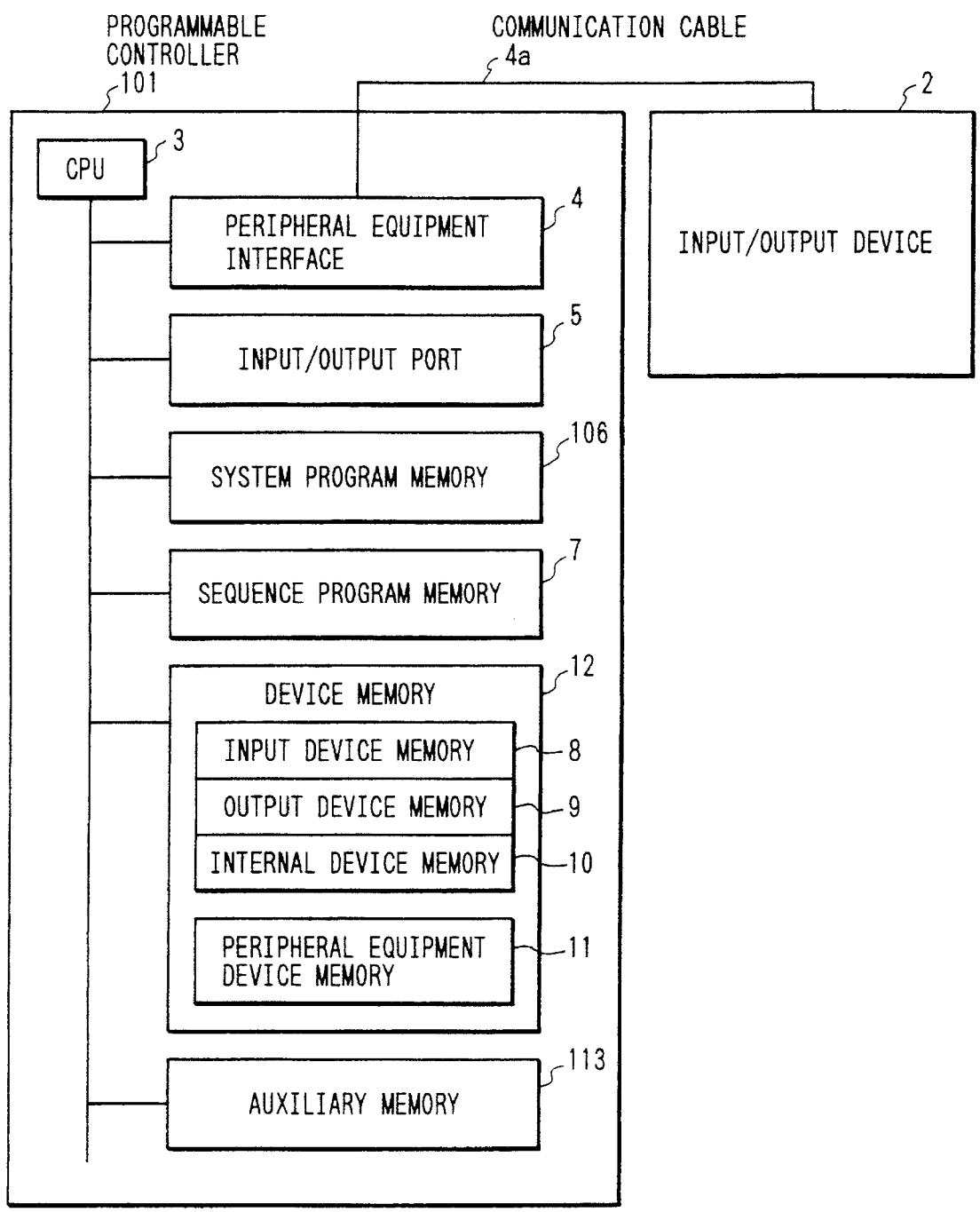
FIG. 1 is a block diagram of a programmable controller according to a first embodiment of the present invention.
Figure 21:
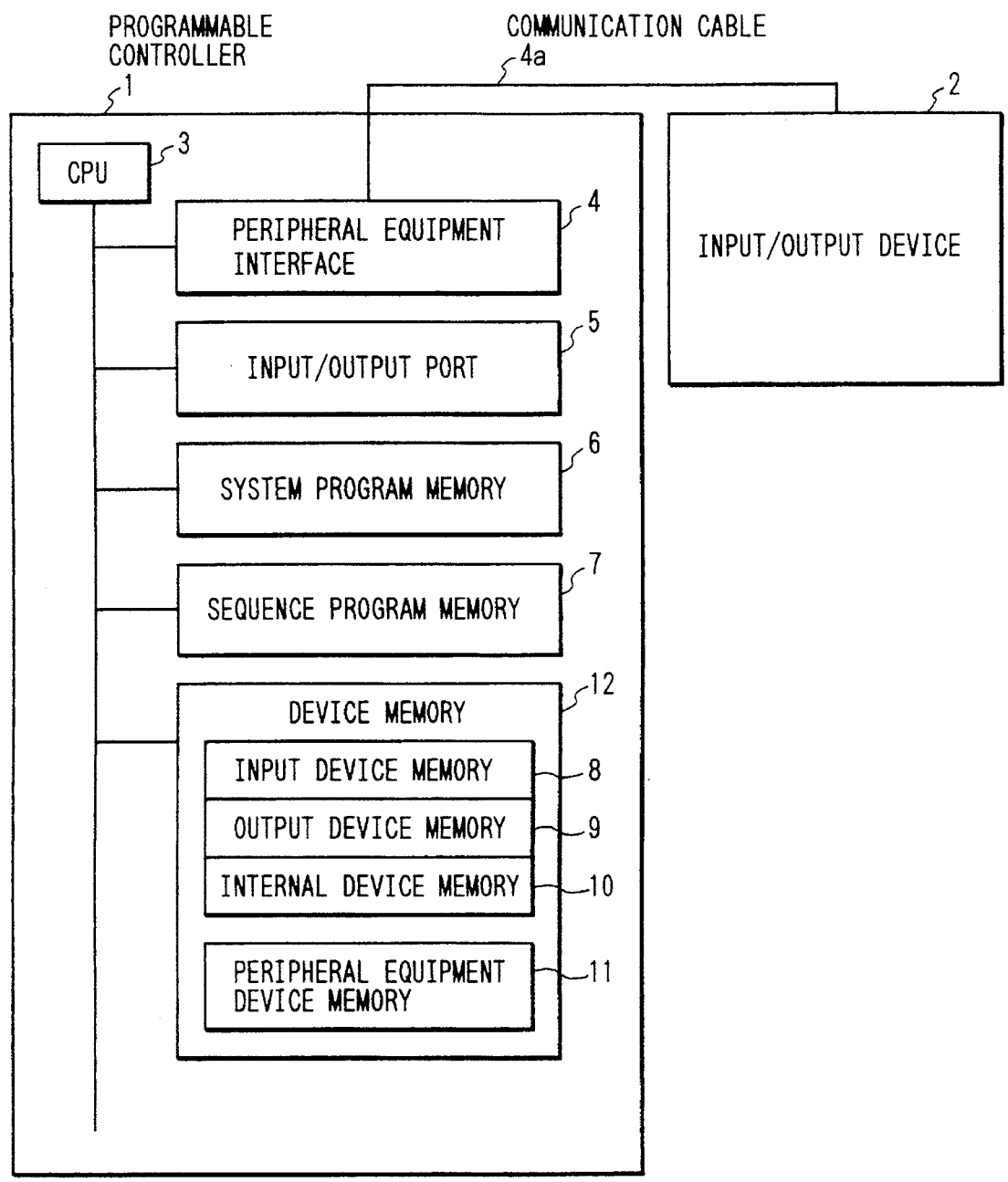
FIG. 21 is a block diagram of a conventional programmable controller known in the art.

FIG. 1 illustrates a block diagram of a first embodiment of the programmable controller of the present invention. In this figure, items 2 through 5, 7 through 12 and 4a are identical to those illustrated in FIG. 21 and will not be discussed here.

The programmable controller unit 101 comprises system program memory 106, and auxiliary memory 113 (e.g., second storage means). The system program memory 106 is similar to the system program memory 6 in FIG. 21, except the contents thereof are different.

The CPU 3 and the system program memory 106 constitute transfer means. Also, it should be noted that this first embodiment is designed to cause the contents of the device memory 12 to be changed sequentially one change at a time at predetermined cycles on the basis of the contents of the auxiliary memory 113.

Figure 2:
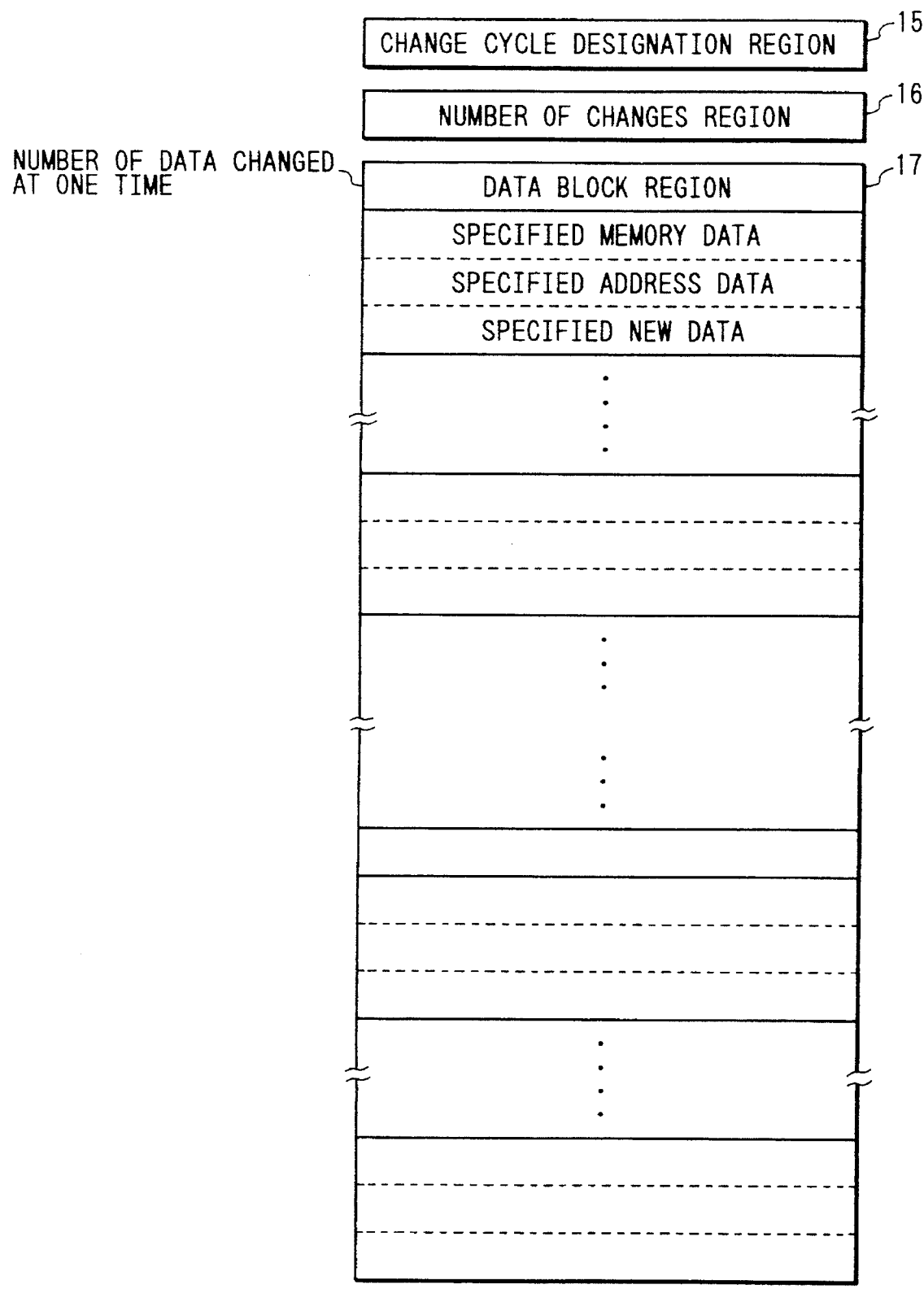
FIG. 2 illustrates an example of data stored in an auxiliary memory of the first embodiment shown in FIG. 1.

FIG. 2 shows the contents of the auxiliary memory 113, which comprises a region 15 where a change cycle designation is stored, a region 16 where the number of changes "m" is stored, and a region 17 where "m" data blocks are stored 17. A single block comprises "n" sets of data. A set comprises specified memory data, specified address data and specified new data, and the "number of data" changed at one time "n". The "number of data" changed at a time "n" indicates the number of addresses at which data is changed at one time, and is stored at the beginning of each data block.

The change cycle designation, stored in region 15, specifies the cycle for changing the contents of the device memory 12. For example, when the contents of the device memory 12 are intentionally changed at each of five sequence program runs, the change cycle designation is set to "5" and "5" is stored in change cycle designation region 15. Also, the number of data blocks, i.e., "m", is stored in the number of changes region 16.

Further, the specified memory data of a data set generally includes data which indicates any of the input device memory 8, the output device memory 9 and the internal device memory 10. If the data indicates the internal device memory, is also indicates the type of the internal device memory. This information is referred to as the device name, and generally, the input device memory 8 is represented by "X", the output device memory 9 by "Y", and the internal device memory 10 by "D", or the like.

Offset address data is stored as the specified address data of the data set, which indicates an offset from the first address of the memory of the corresponding device name. This offset address stored as the specified address data is generally referred to as the device number. For example, by representing the device of whose device name it "Y" and device number is "20" as "Y20" allows the corresponding address of the device memory 12, i.e., the corresponding device, to be specified. The specified new data indicates how the contents of the corresponding device specified by the specified memory data and specified address data are intentionally changed.

For instance, this data is "1" when the data of the corresponding device is set to "1" (ON) and is "0" when that data is set to "0" (OFF). When device changes are made three times, for example, when input device X0 is switched on at a first time, X1 is switched on at a next time, and X2 is switched on at a last time, the value "m" is 3 and "3" is stored in region 16. Also, for example, when output device Y10 is switched on and output device Y11 is switched off simultaneously at a change time, "n" is 2 and the "number of data" changed at one time "n" is set to 2.

The operation of memory write start processing according to the embodiment of the present invention will now be described in accordance with the flowchart in FIG. 3.

The system program memory 106 has five regions for storing a cycle counter for counting the time interval of a predetermined cycle, an m counter for counting the number of changes made, an n counter for counting the number of addresses rewritten per change, a write processing flag indicating whether memory write processing is actually performed or not, and a data pointer indicating the current address of the auxiliary memory 113. The interrupt processing shown in FIG. 3 may be started when all data is stored into the auxiliary memory 113.

Figure 3:
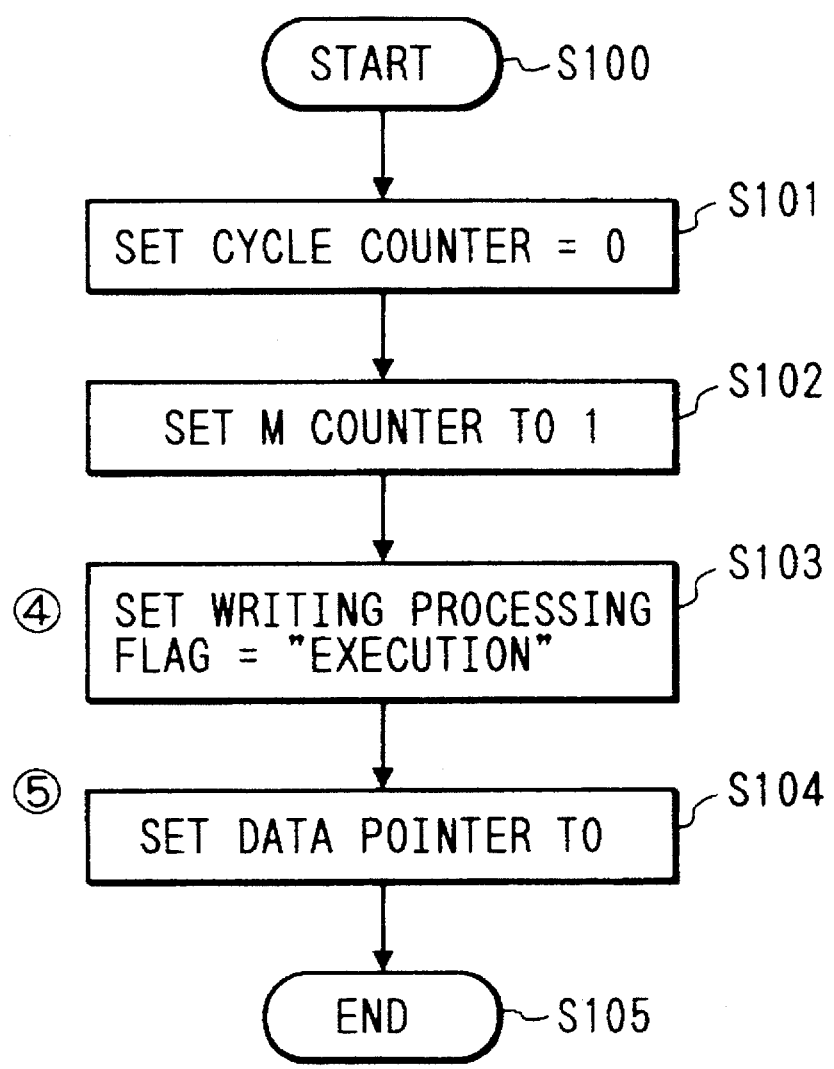
FIG. 3 is a memory write start processing flowchart according to the first embodiment of the present invention.

When an operator provides a memory write start request from the peripheral equipment 2 during the execution of the sequence program, interrupt processing shown in FIG. 3 is initiated. Namely, as in FIG. 3, the operation progresses from step S100 to step S101.

In step S101, the cycle counter is set to the initial value of "0" and the processing proceeds to step S102. In step S102, the m counter is set to the initial value of "1" and the processing advances to step S103. Then, in step S103, the write processing flag is set to a value indicating "execution" and the processing moves to step S104.

In step S104, the data pointer is set to the first address of region 17. Then, the processing progresses to end step S105 to terminate the memory write start processing and end the interrupt processing.

Memory write processing for forcing device states to be changed will now be described in accordance with a memory write processing flowchart shown in FIG. 4.

Figure 4:
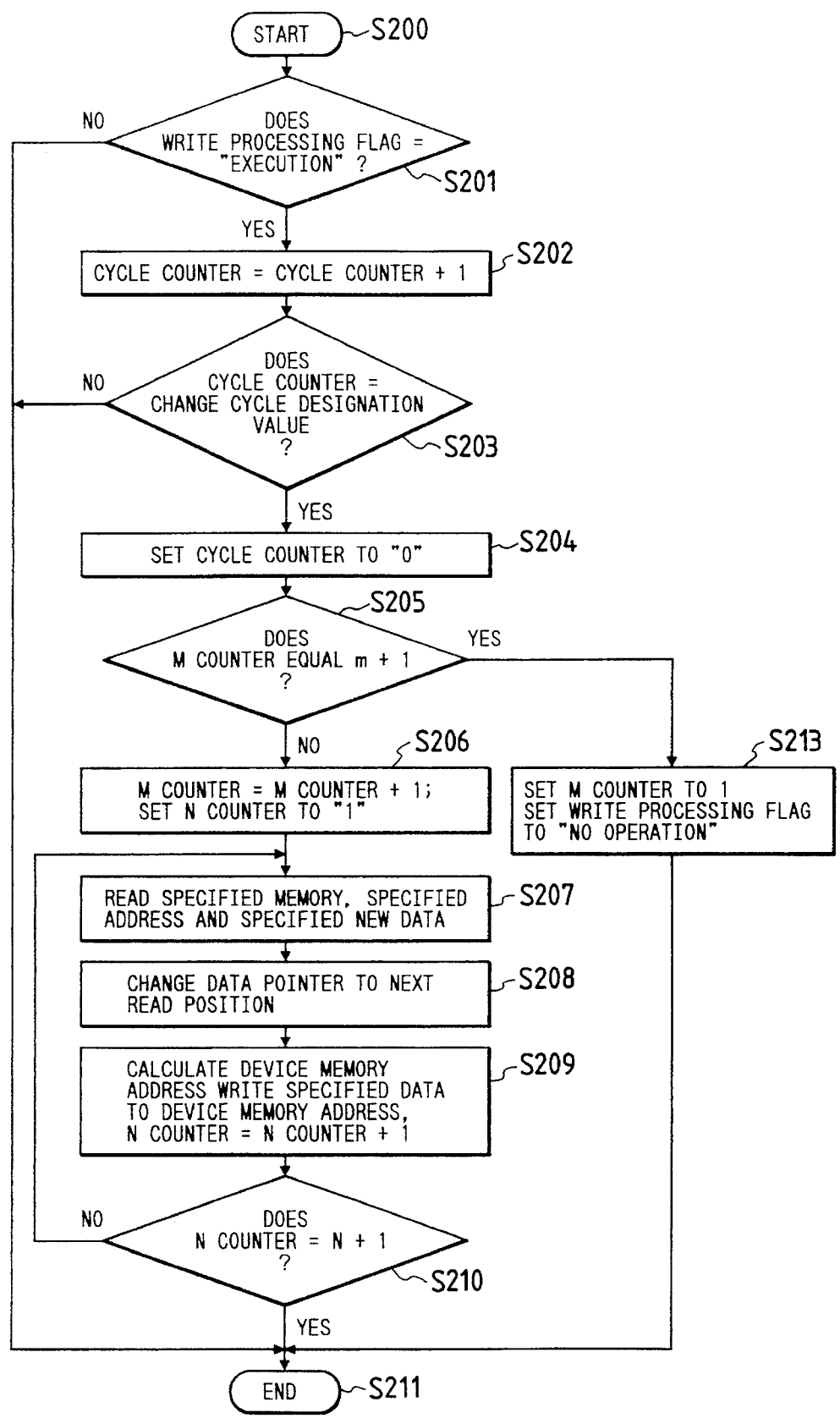
FIG. 4 is a memory write processing flowchart according to the first embodiment of the present invention.
Figure 5:
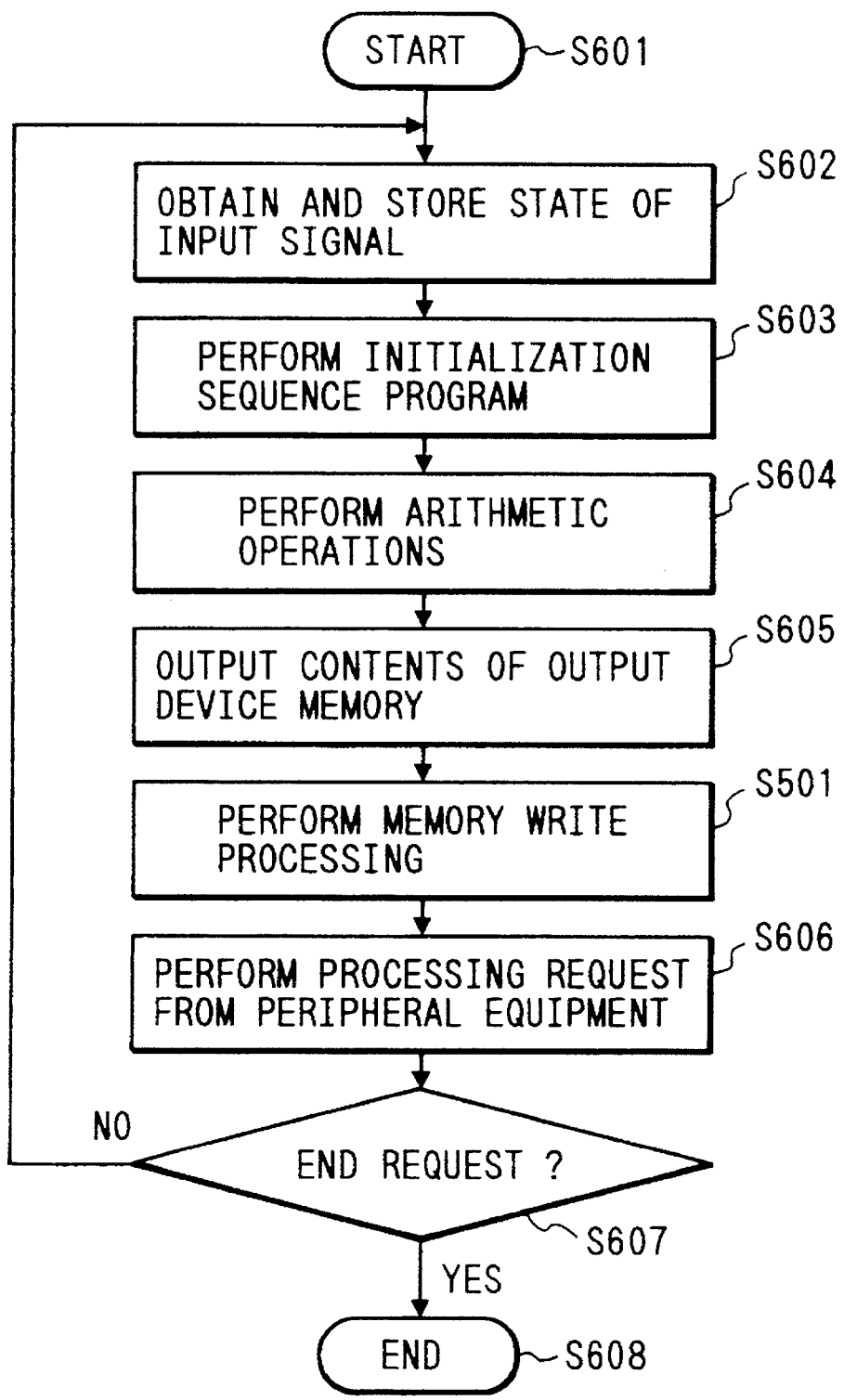
FIG. 5 is an operation flowchart of the programmable controller with which the first embodiment of the present invention is employed.
Figure 22:
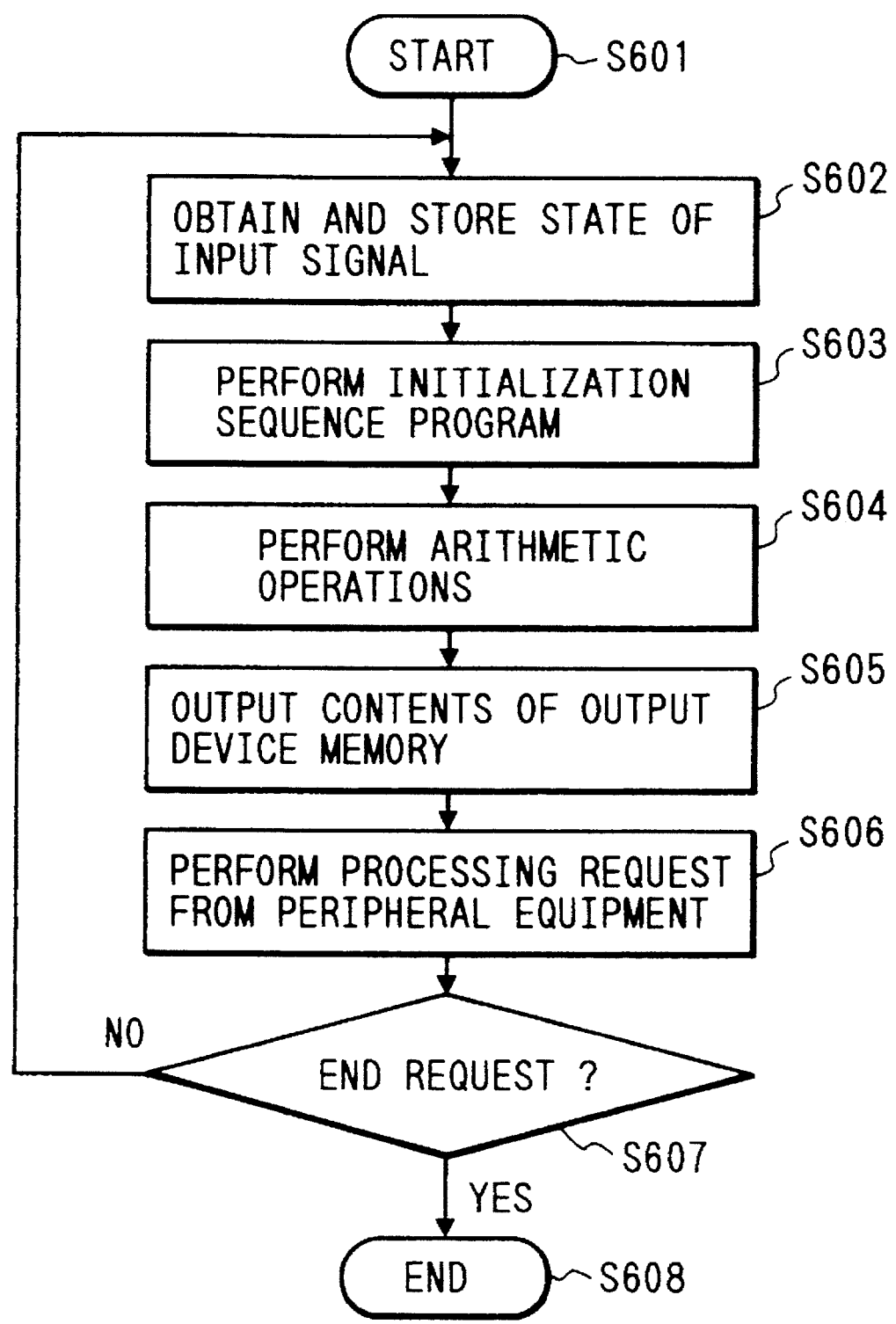
FIG. 22 is an operation flowchart of the conventional programmable controller shown in FIG. 21.

The operation shown in the flowchart of FIG. 4 is executed in step S501 of FIG. 5. FIG. 5 is identical to FIG. 22 showing the operation of the conventional apparatus, with the exception that step S501 is inserted between steps S605 and S606. Since the programmable controller repeats the execution of the sequence program as described previously, the operation shown in FIG. 4 is executed periodically.

When the processing proceeds from start step S200 to step S201 in FIG. 4, it is determined in step S201 whether or not the write processing flag has a value indicating "execution". If the value does not indicate "execution", the processing advances to end step S211. However, if the value indicates "execution", the processing moves to S202.

In step S202, the cycle counter is incremented by 1 and the processing progresses to step S203. In step S203, the value of the cycle counter is compared with the change cycle designation value stored in data region 15. If they do not match, the processing proceeds to end step S211. However, if they match, the processing moves to step S204, where the cycle counter is reset to the initial value of "0" for later counting and the processing advances to step S205.

In step S205, the value of the m counter is compared with a value obtained by adding "1" to the data "m" stored in region 16. If they match, it is determined that all specified devices have been changed and the processing moves to step S213. If they do not match, it is determined that the memory write processing is not yet complete and the execution proceeds to step S206.

If the processing advances to step S213, the value of the m counter is reset to the initial value of "1" and the write processing flag is set to a value indicating "no operation" in step S213, and the processing advances to end step S211. However, if the processing advances from step S205 to step S206, 1 is added to the m counter, the value of the n counter is set to the initial value of "1", and the processing continues to step S207.

In step S207, the specified memory data, the specified address data and the specified new data directed by the data pointer are read and the processing continues to step S208. In step S208, the data pointer is changed to a next read position to prepare for a next read and the processing progresses to step S209.

In step S209, the address of the device memory 12 is calculated from the specified memory data and the specified address data, the specified new data is written to that address, the n counter is incremented by 1, and the processing continues to step S210. For example, if output device Y20 has been specified, that is, if the specified memory data represents "Y" and the specified address represents "20", the first address of the output device memory 10 is obtained as "Y", and an offset of "20" is added thereto to define the address to which the specified new data is to be written. Alternatively, if it is specified that data is to be written to the input device memory 8, data is not written to the input device memory 8, but is written to the peripheral equipment input device memory 11 as described previously in the description of the simulation operation in the conventional art.

In step S210, the value of the n counter is compared with a value found by adding 1 to n, stored in region 17, to determine whether the specified new data has been written the number of times indicated by the "n" value (i.e., "n" times). If writing is not completed, the processing returns to step S207 and steps S207 through S210 are executed again. However, if it is determined in step S210 that the n pieces of specified new data have been written, (the n counter=n+1), the processing advances to end step S211, where the memory write processing is terminated. When the processing reaches end step S211, the operation of the programmable controller unit 101 progresses from step S501 to step S606 in FIG. 5.

As described above, the contents of the device memory 12 can be intentionally changed at each predetermined cycle according to the data stored in the auxiliary memory 113. Further, the n counter and the m counter are embodied by the system program stored in the system program memory 106 and by the CPU 3. This is also true for the processing operations illustrated in FIGS. 3 and 4.

In addition, the auxiliary memory 113 need not be an ordinary RAM, and may be, for example, an IC memory card. When an IC memory card is used, the IC memory card, which is loaded with the required data written from another general-purpose personal computer, may be fitted to the programmable controller unit 101.

Furthermore, the peripheral equipment may be provided with an additional function which enables data to be written to the IC memory card. As in the conventional technique of the programmable controller, a function called sampling trace is available. This sampling trace function stores the states of specified devices to a predetermined memory area sequentially at predetermined intervals, and reads and displays that memory area according to the instructions provided by the operator from the peripheral equipment. This function provides a history of the past states of the corresponding devices.

The data shown in FIG. 2 may be created by said sampling trace and written to the auxiliary memory 113. Also, the data shown in FIG. 2 may be created by the sampling trace, edited, and written to the auxiliary memory 113.

Figure 6:
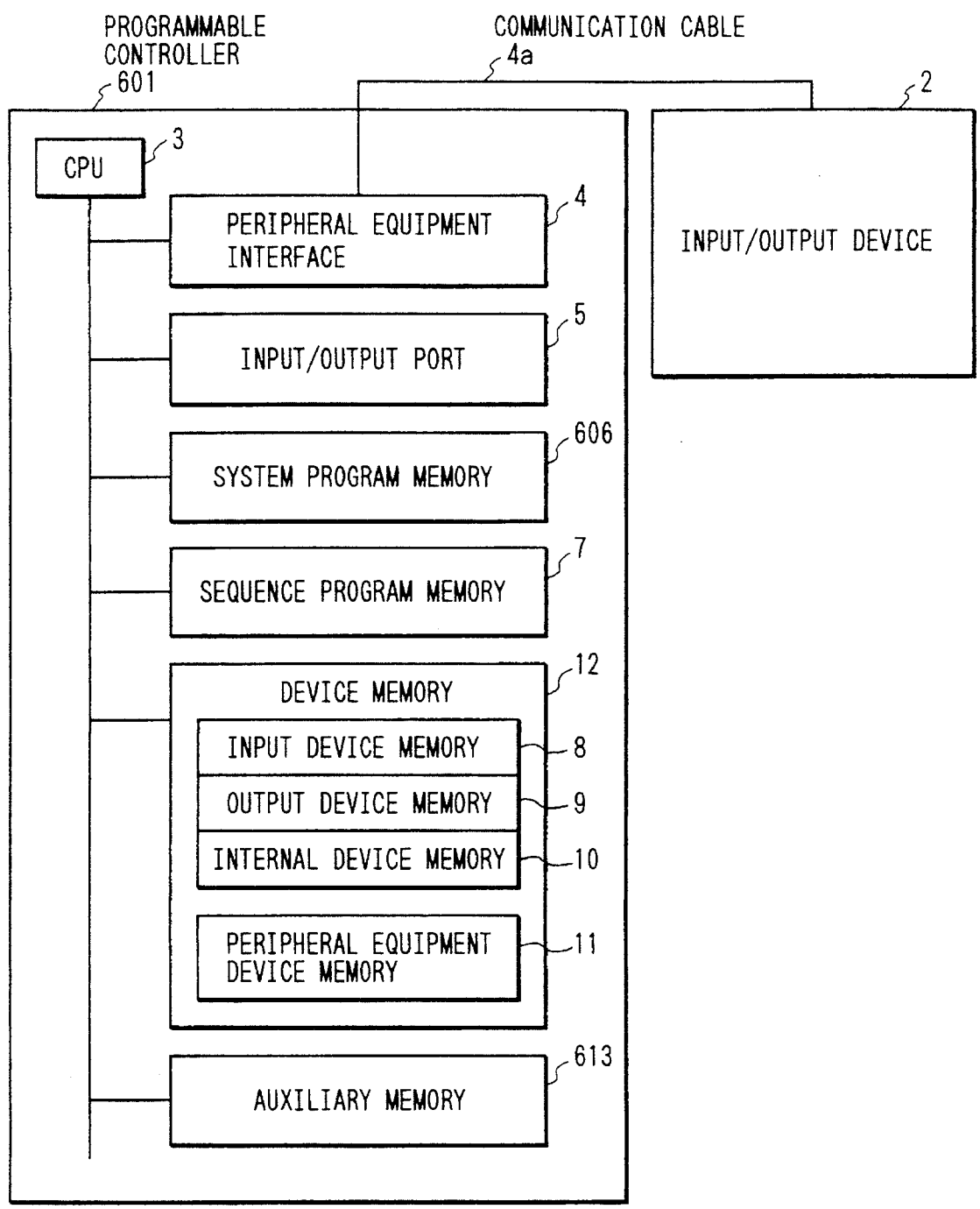
FIG. 6 is a block diagram of a programmable controller according to a second embodiment of the present invention.

A second embodiment of the present invention will now be described. FIG. 6 is a block diagram of a programmable controller, showing the second embodiment. In this drawing, numerals 2 to 5, 7 to 12 and 4a identify parts identical to those shown in FIG. 21.

Programmable controller unit 601 comprises system program memory 606 and an auxiliary memory (i.e., second storage means). System program memory 606 and auxiliary memory 613 are similar to the system program memory 106 and the auxiliary memory 113 in FIG. 1, respectively, with the exception that their contents are different.

Unlike the programmable controller unit 101 in FIG. 1, the programmable controller unit 601 has a timing device (e.g., "timing means") to allow the current time to be read. The CPU 3 and the system program memory 606 constitute the timing device and transfer device.

The second embodiment is designed to force the contents of the device memory 12 to be changed at preset times on the basis of the storage contents of the auxiliary memory 613.

Figure 7:
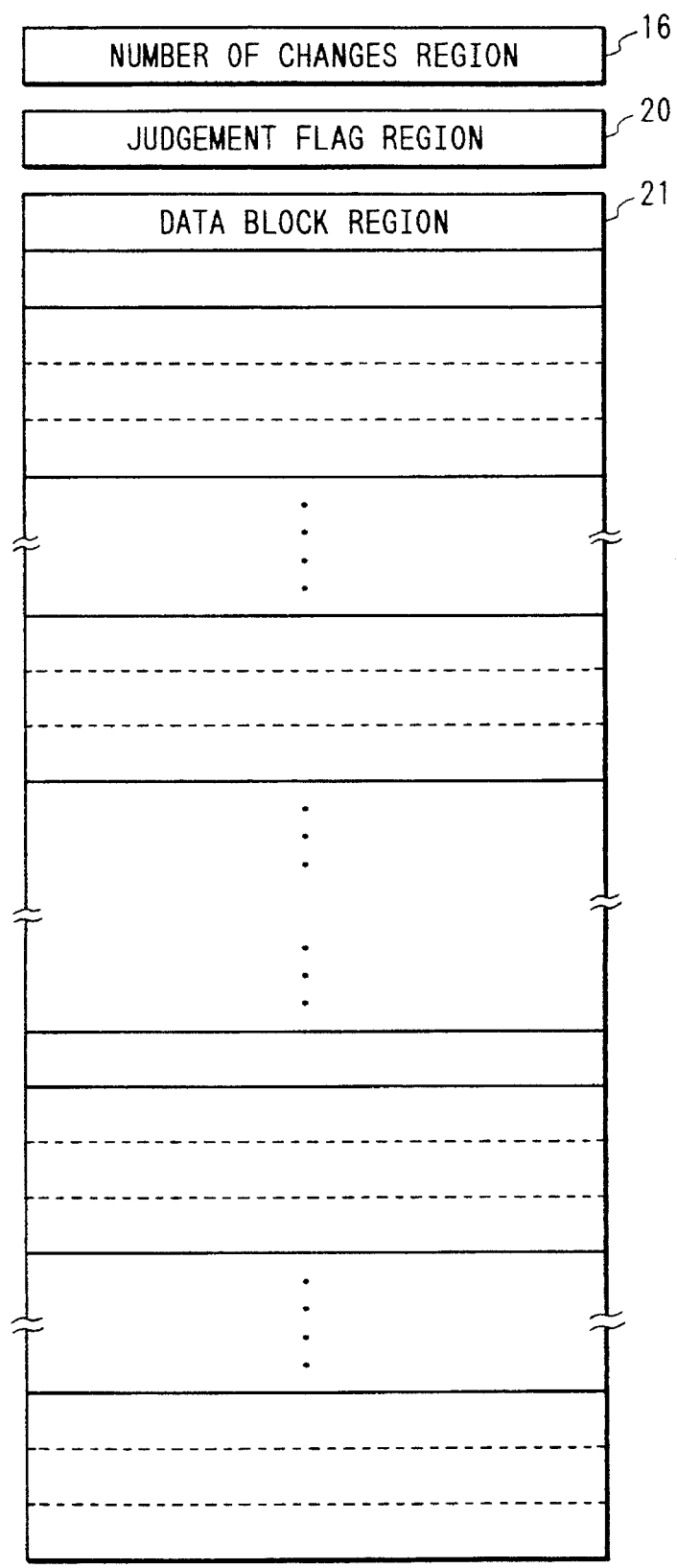
FIG. 7 illustrates an example of data stored in auxiliary memory of the second embodiment shown in FIG. 6.

FIG. 7 shows the storage contents of the auxiliary memory 613 in the second embodiment of the present invention.

In this drawing, region 16 is a region similar to that shown in FIG. 2. Region 20 stores a judgement flag. Region 21 stores "m" number of blocks. A single block comprises "n" sets of data. One set of such data comprises the specified memory data, specified address data and specified new data, change time-of-day designation data, and the number "n" of data changed at a time.

The number "n" of data changed at a time indicates the number of addresses at which data is changed at one time when a data change is made. Also, the change time-of-day designation data is stored at the beginning of each block and the number "n" of data changed at one time is stored next to the change time designation data.

As in FIG. 2, region 16 stores the number of changes "m" which corresponds to the number of data blocks. Also, region 20, stores the judgement flag 20 which indicates whether or not the changing operation of the device memory 12 contents according to this second embodiment is performed. Further, the change time designation data indicates the time when the contents of the device memory 12 is changed according to the data of the corresponding block. The number of data changed at one time, the specified memory data, the specified address data and the specified new data are identical to their corresponding data in the first embodiment.

The operation of memory write processing according to the second embodiment will now be described in accordance with the flowchart in FIG. 8.

Figure 8:
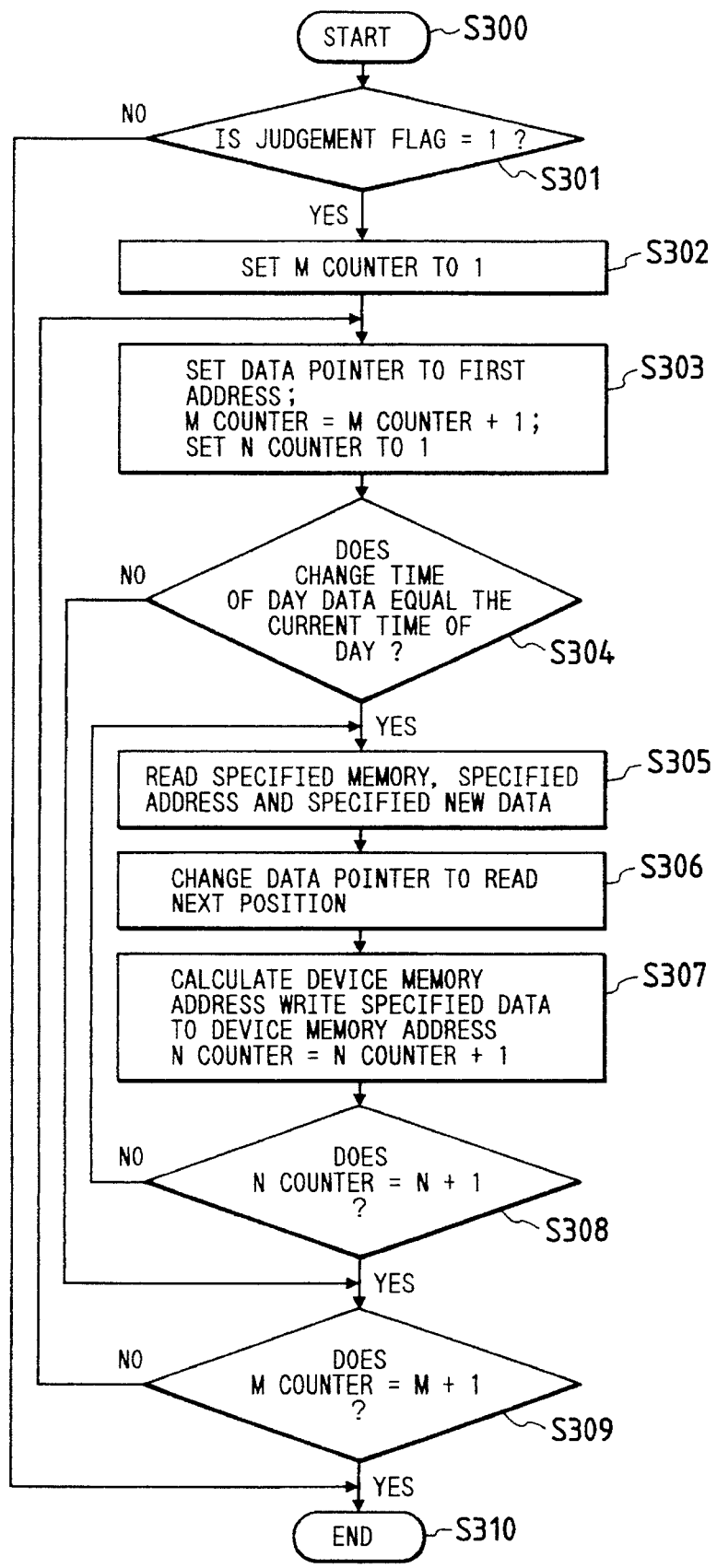
FIG. 8 is a memory write processing flowchart according to the second embodiment of the present invention.
Figure 9:
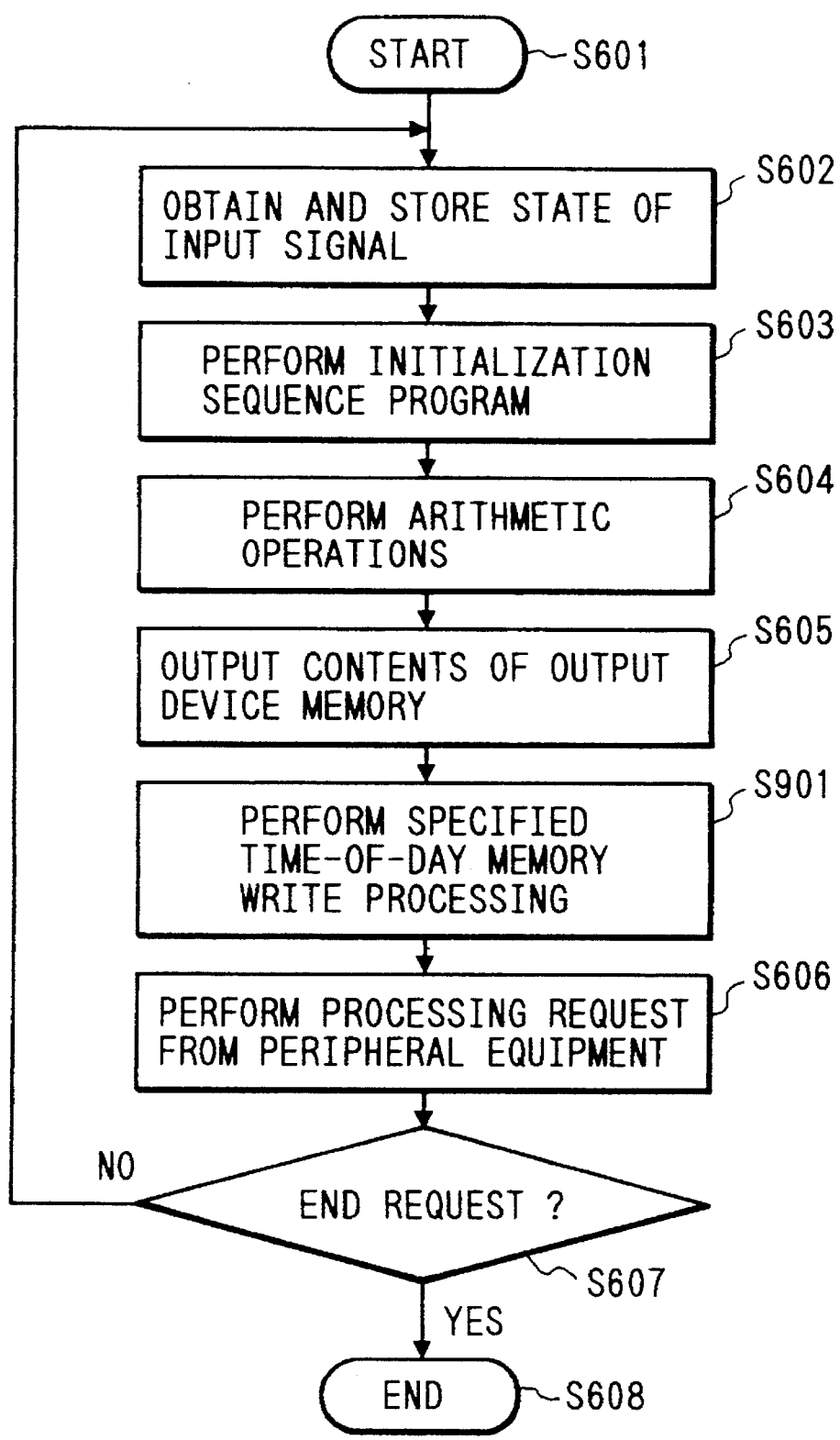
FIG. 9 is an operation flowchart of the programmable controller with which the second embodiment of the present invention is employed.

The operation shown in the flowchart of FIG. 8 is executed in step S901 of FIG. 9. FIG. 9 is identical to FIG. 22, showing the process of the conventional art, with the exception that step S901 is inserted between steps S605 and S606. Since the programmable controller repeats the execution of the sequence program as described previously, the operation shown in FIG. 8 is executed periodically as in the first embodiment. Also, it is assumed that the judgement flag in region 20 is set to "1", meaning that memory write processing is to be executed.

When the programmable controller unit 601 enters the stage of executing step S901, the processing proceeds from step S300 to step S301 in FIG. 8. In step S301, it is determined whether the judgement flag is "1". The processing advances to end step S310 if the judgement flag is not "1", and advances to step S302 if the judgement flag is "1".

In step S302, the value of the m counter is set to the initial value of "1" and the processing progresses to step S303. In step S303, the data pointer is set to the first address of a block indicated by the value of the m counter, i.e., the block read next in the region 21. Further, the value of the m counter is incremented by 1, the value of the n counter is set to the initial value of 1, and the processing proceeds to step S304.

In step S304, the data of the change time designation of the corresponding block is compared with the current time. If they do not match, the processing advances to step S309. If they match, the execution progresses to step S305. Note that this determination is made within a certain degree of tolerance.

The operations of steps S305 to S307 are identical to those of steps S207 to S209 in FIG. 4 of the first embodiment. In step S308, it is determined whether or not the number of data to be written has been written, that is, whether the value of the n counter is equal to n+1. If the writing is not yet completed, the processing returns to step S305 and the operations of steps S305 to S308 are executed again. If it is determined in step S308 that the writing is completed, the execution proceeds to step S309.

In step S309, it is determined whether or not changes have been made "m" times as indicated by the number of changes "m" by comparing the value of the m counter and a value m+1. If the changes are completed, the processing advances to end step S310, where the memory write processing is terminated. If it is determined that the changes are not completed, the execution returns to step S303 and step S303 is re-executed.

Upon reaching end step S310, the processing advances from step S901 to step S606 in FIG. 9.

As described above, the contents of the device memory 12 can be intentionally changed at the specified times according to the data stored in the auxiliary memory 113. Further, it should be understood that "m" may be 1, indicating that only 1 change is to be made.

A third embodiment of the present invention will now be described.

Figure 10:
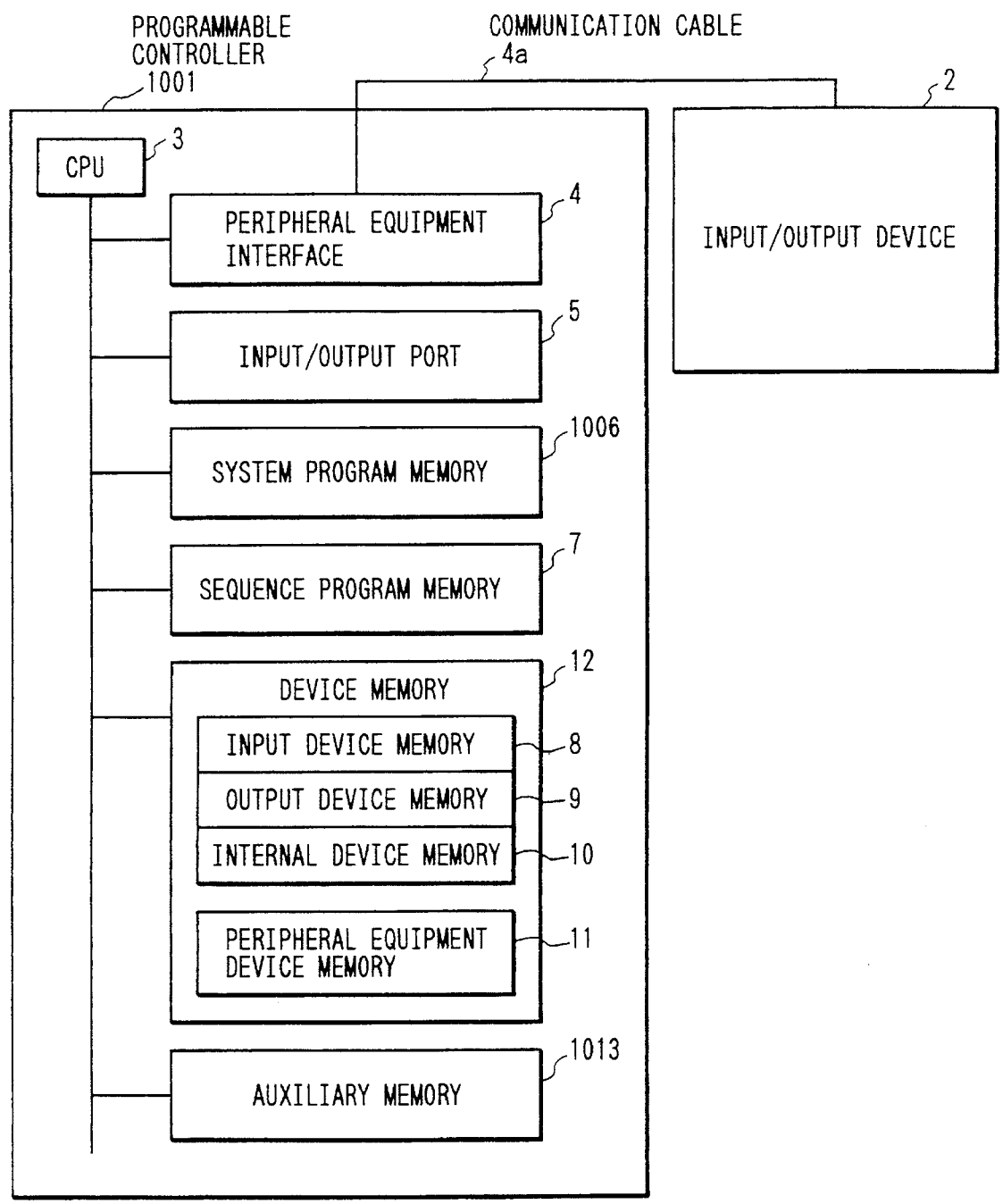
FIG. 10 is a block diagram of a programmable controller according to a third embodiment of the present invention.

FIG. 10 is a block diagram of a programmable controller of the third embodiment. In this drawing, the numerals 2 to 5, 7 to 12 and 4a represent parts identical to the those shown in FIG. 21. Programmable controller unit 1001 comprises system program memory 1006 and an auxiliary memory 1013 (i.e., second storage means). Note that the system program memory 1006 and the auxiliary memory 1013 are similar to the system program memory 106 and the auxiliary memory 113 in FIG. 1, respectively, with the exception that their contents are different. Further, the CPU 3 and the system program memory 1006 constitute transfer means.

The third embodiment is designed to initialize the device memory 12 on the basis of the storage contents of the auxiliary memory 1013 at the operation start time, such as power-on, of the programmable controller unit 1001.

Figures 11, 14:
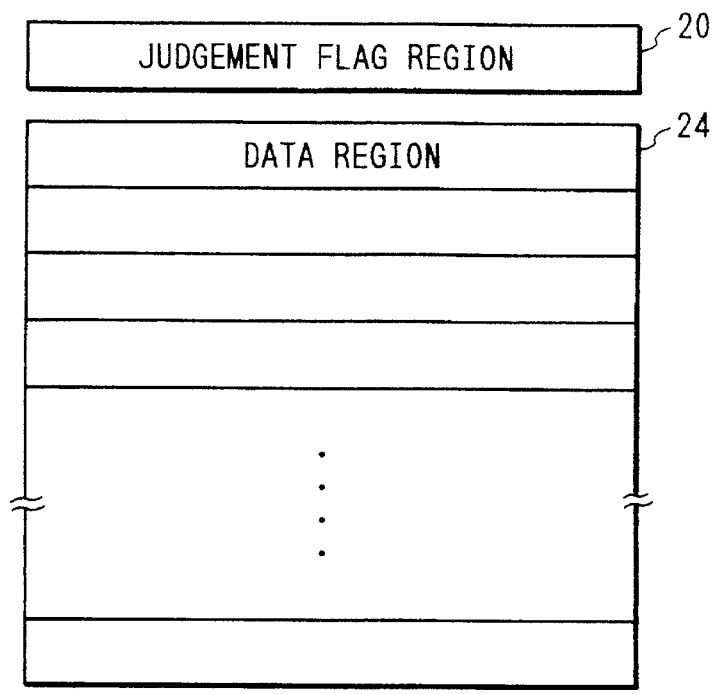
FIG. 11 illustrates an example of data stored in auxiliary memory of the third embodiment shown in FIG. 10.
FIG. 14 illustrates an example of data stored in an auxiliary memory of the third embodiment shown in FIG. 10.

FIG. 11 shows the storage contents of the auxiliary memory 1013 in the third embodiment of the present invention. In this drawing, region 20 contains a judgment flag and data region 24 contains the number of data changed "n", the specified memory data, the specified address data, and "n" pieces of specified new data.

Note that the number "n" of data changed at one time indicates the number of addresses in which data is changed at such a time. The judgement flag indicates whether or not the change operation of the device memory 12 contents is performed according to the third embodiment. The specified memory, the specified address and the specified new data are identical to the corresponding data in the first embodiment. Further, as shown in FIG. 11, the specified memory and specified address are not stored for each specified new data, but one set of stored specified memory data and specified address data are stored for "n" pieces of specified new data.

Figure 12:
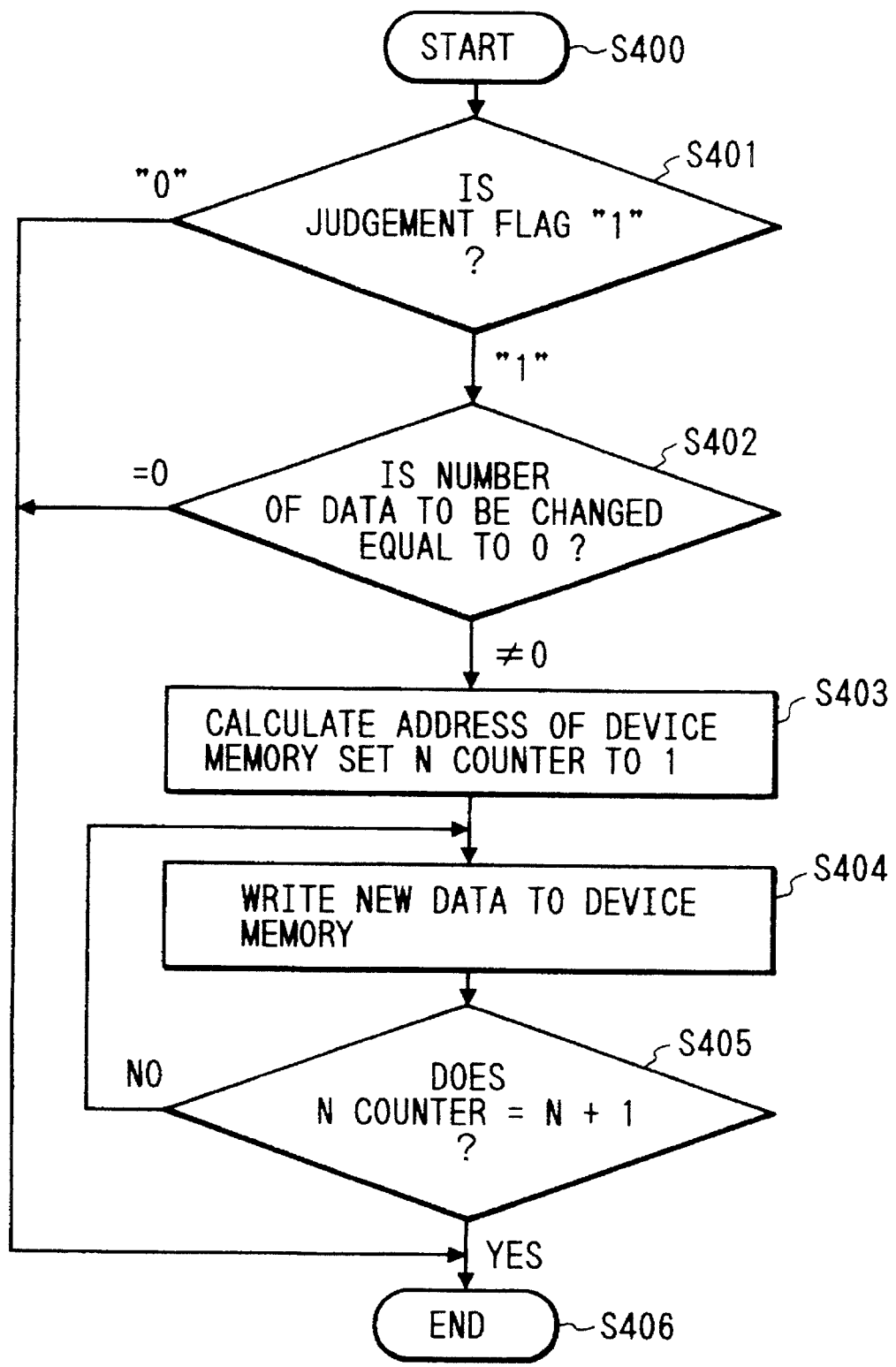
FIG. 12 is a memory write start processing flowchart according to the third embodiment of the present invention.
Figure 13:
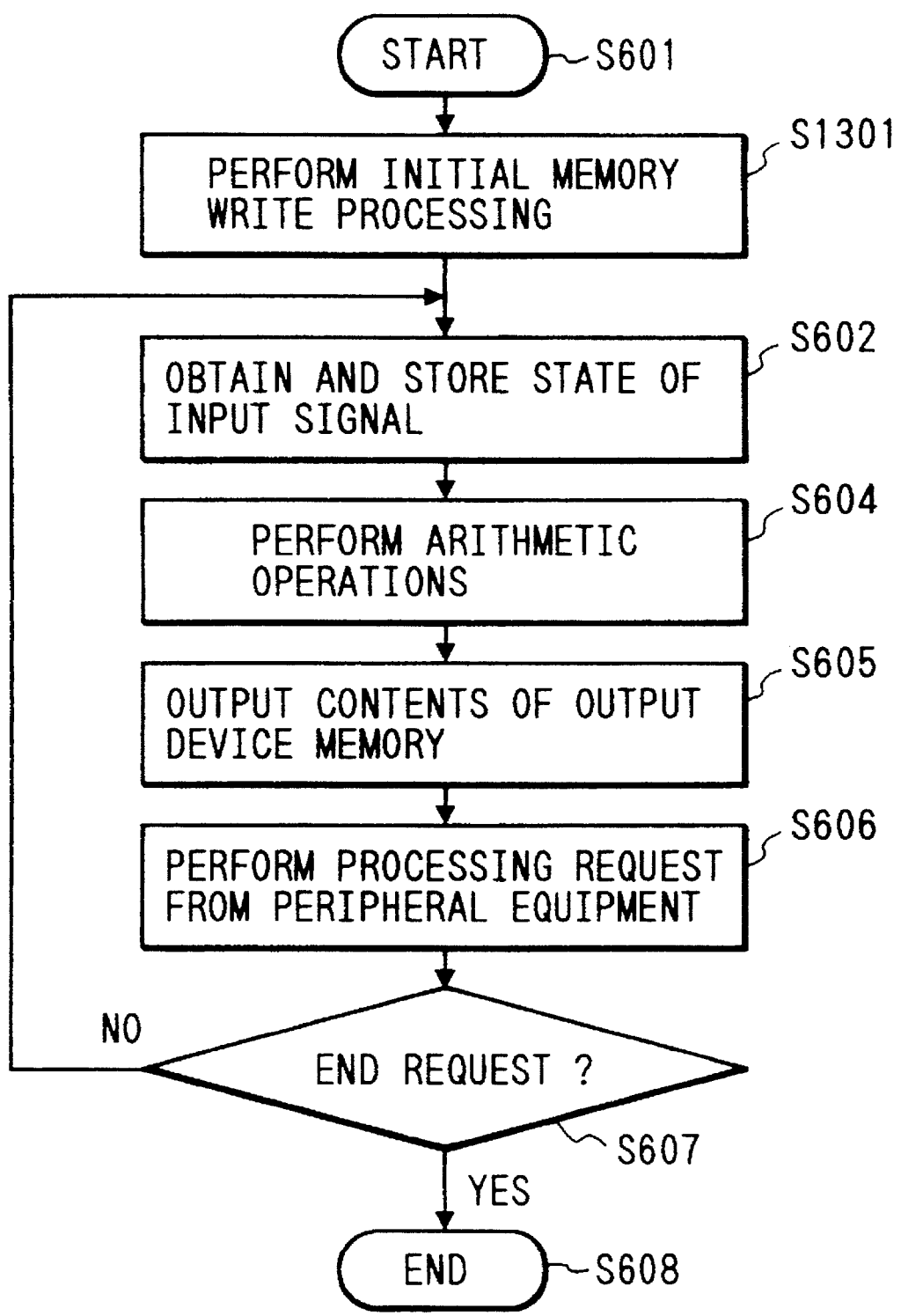
FIG. 13 is an operation flowchart of the programmable controller with which the third embodiment of the present invention is employed.

The operation of the third embodiment will now be described in accordance with a memory write processing flowchart shown in FIG. 12. The operation shown in the flowchart of FIG. 12 is executed in step S1301 of FIG. 13. FIG. 13 is identical to FIG. 22 showing the conventional art with the exception that step S603 does not exist, step S1301 is executed subsequently to start step S601, step S602 is executed after step S1301, and the execution returns to step S602 if it is determined in step S607 that the processing is not completed.

Generally, at a power on condition or the like, the programmable controller unit 1001 starts operation and the processing proceeds from start step S601 to step S1301. For exemplary purposes, it is assumed that "1" is stored in the judgement flag in region 20, thus indicating that memory write processing is to be executed.

When the programmable controller unit 1001 executes step S1301, the processing progresses from start step S400 to step S401 in FIG. 12. In step S401, it is determined whether or not "1" is stored in the judgement flag in region 20. If the judgement flag is not "1", the processing advances to end step S406 where the memory write processing terminates. If the judgement flag is "1", the processing moves to step S402.

In step S402, it is determined whether or not the number of data to be changed is 0. If it is 0, the execution advances to end step S406 where the memory write processing terminates. If it is not equal to 0 (e.g., 1 or greater), the processing proceeds to step S403.

In step S403, the address of the device memory 12 is calculated from the specified memory data and specified address data, the value of the n counter is set to the initial value of "1", and the processing progresses to step S404. In step S404, the new data specified by the value of the n counter at the calculated address is written to the device memory 12 and the processing moves to step S405. When it is desired to intentionally change the contents of the input device memory 8, the specified new data is written to the peripheral equipment input device memory 11 as described in the explanation of the simulation operation in the conventional art.

In step S405, it is determined whether or not the value of the n counter is equal to n+1 to determine whether all data of the number of data to be changed "n" has been written to the device memory 12. If all data has been written, the execution advances to end step S406 where the memory write processing terminates. If all data has not yet been written, the processing returns to step S404. At end step S406, the operation of the programmable controller unit 1001 proceeds from step S1301 to step S602 in FIG. 13.

FIG. 14 shows an example of data set to the auxiliary memory 1013.

Figure 23:
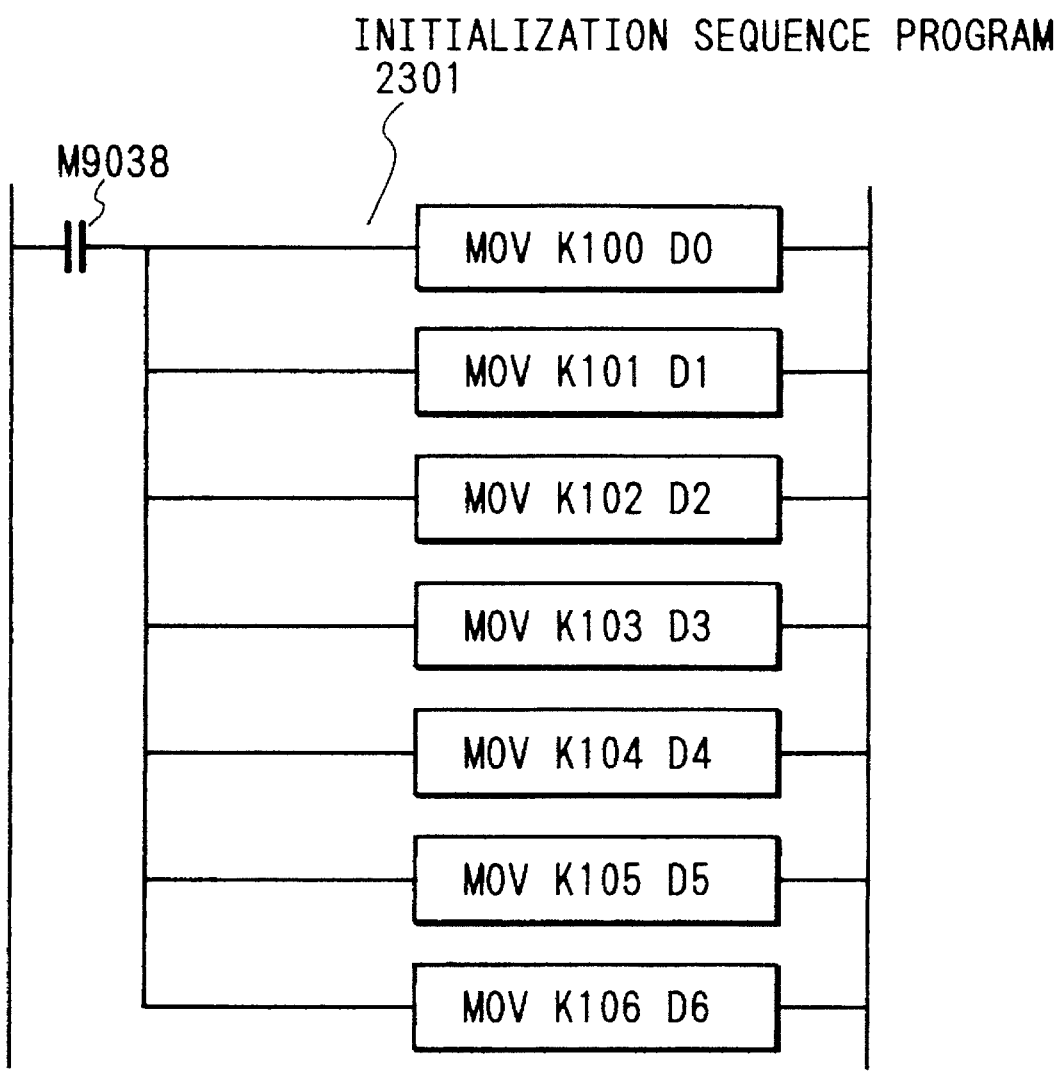
FIG. 23 is a ladder diagram of a device for initializing device memory in a sequence program of the conventional programmable controller.

As shown, for example, in FIG. 14, values for the judgement flag (e.g., "1"), the number of data changed (e.g., "7"), the specified memory (e.g., "68"), the specified address (e.g., "0"), the specified new data 1 to 7 (e.g., "100", "101", "102", "103", "104", "105" and "106", respectively) are stored in the auxiliary memory 1013. When the contents of the auxiliary memory 1013 have been preset as shown in FIG. 14, the device memory 12 is set to the same states as when the sequence program of the conventional art, as shown in FIG. 23, is executed.

In the conventional processing shown in FIG. 22, since step S603 was executed regardless of whether initialization was actually preformed, it was difficult to reduce the time of the sequence program execution cycle. According to the third embodiment, however, such operation is not performed and accordingly, the sequence program execution cycle time is reduced.

A fourth embodiment of the present invention will now be described.

Figure 15:
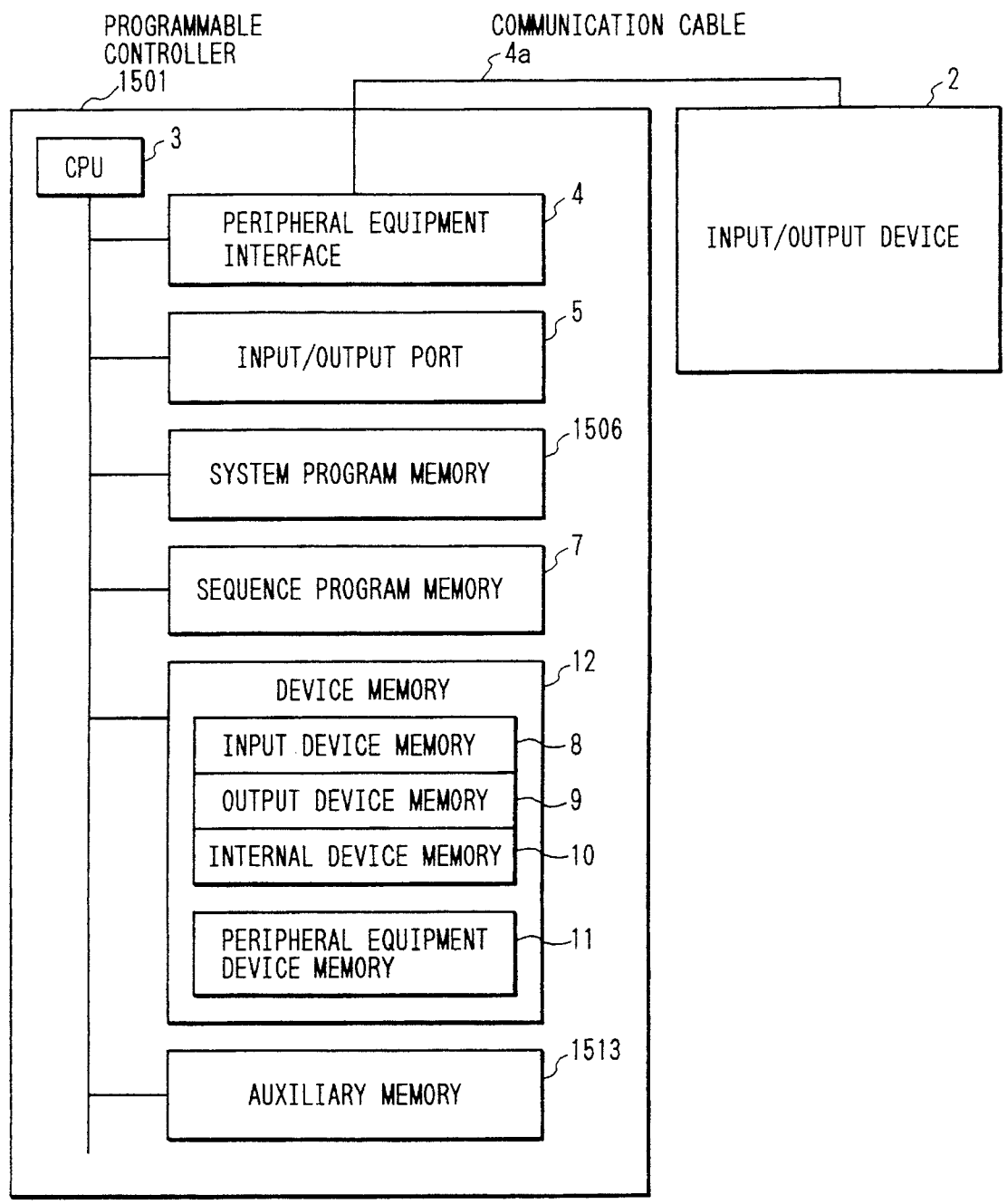
FIG. 15 is a block diagram of a programmable controller according to a fourth embodiment of the present invention.

FIG. 15 is a block diagram of a programmable controller of the fourth embodiment. In this drawing, numerals 2 to 5, 7 to 12 and 4a identify parts identical to those shown in FIG. 21.

Programmable controller unit 1501 comprises system program memory 1506 and auxiliary memory (second storage means) 1513. The system program memory 1506 and the auxiliary memory 1513 are similar to the system program memory 106 and the auxiliary memory 113 in FIG. 1, respectively, with the exception that their contents are different. Also, as in previous embodiments, the CPU 3 and the system program memory 1506 constitute transfer means.

Figure 16:
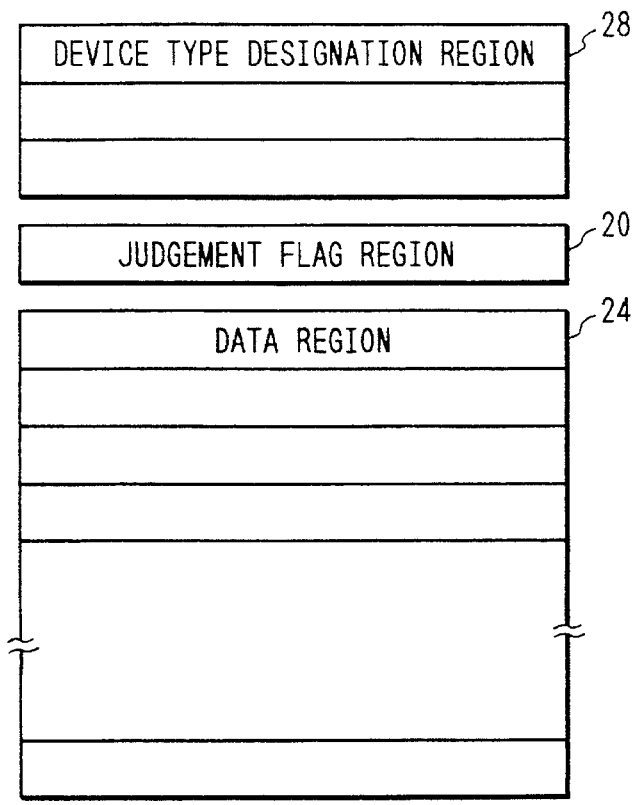
FIG. 16 illustrates an example of data stored in an auxiliary memory of the fourth embodiment shown in FIG. 15.

FIG. 16 shows the storage contents of the auxiliary memory 1513 in the fourth embodiment of the present invention. Region 28 contains the device type designation data, device number designation and condition data. Regions 20 and 24 are identical to those of the third embodiment shown in FIG. 11.

In the fourth embodiment, the contents of the device memory 12 are changed when the data of the device memory 12 at the address specified by the device type designation data and device number designation data matches the value of the condition data. The address of the device memory 12 is specified by the device type designation and device number designation like the address of the device memory 12 is specified by the specified memory data and specified address data. If the data at the address specified by the device type designation and device number designation, i.e., the specified device, is "bit based", the condition data is 1-bit information (either "1" or "0"). However, if the specified device is "word based", the condition data is a numerical value.

The operation of the fourth embodiment will now be described with reference to FIG. 17.

Figure 17:
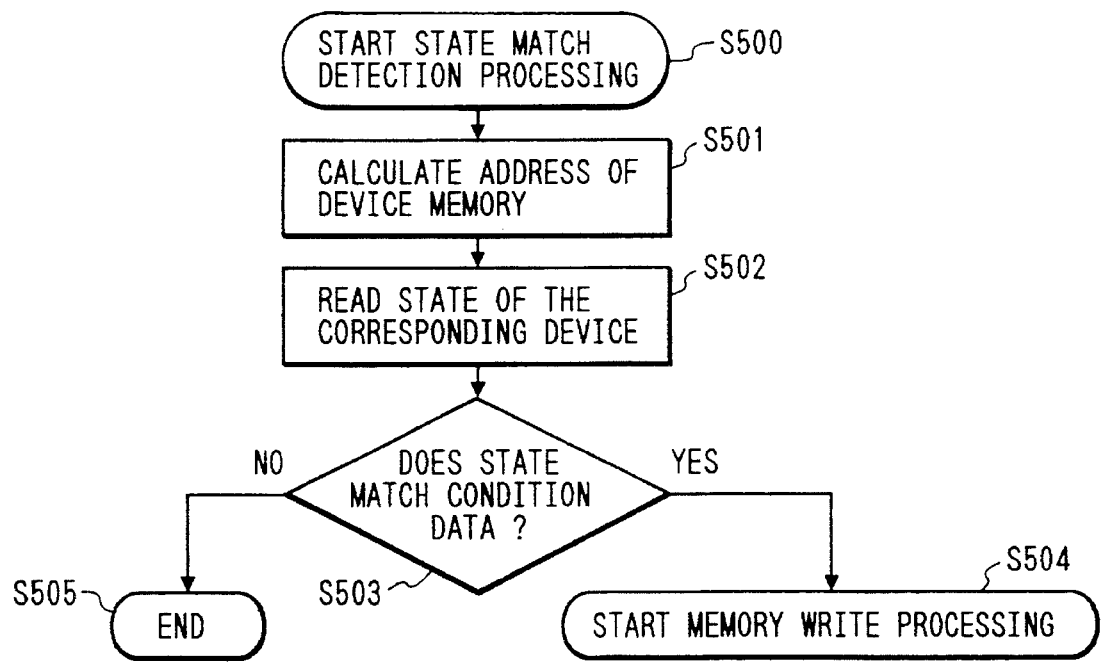
FIG. 17 is a processing flowchart for detecting whether a device state matches condition data according to a fourth embodiment of the present invention.

FIG. 17 is an operation flowchart for detecting a match of the condition data with the contents of the specified device. This processing is executed by interrupt operation generated at a predetermined cycle during the operation of the programmable controller unit 1501. Namely, the operation shown in FIG. 17 is executed at the predetermined cycle during the operation of the programmable controller unit 1501. Also, note that the predetermined cycle is generally set to be shorter than the sequence program execution cycle.

When the interrupt operation is initiated, as shown in FIG. 17, the execution advances from start step S500 to step S501. In step S501, the address of the device memory 12 is calculated from the device type designation data and device number designation data, and the processing advances to step S502. In step S502, data at the corresponding address, that is, the state of the corresponding device, is read and the execution moves to step S503.

In step S503, it is determined whether or not the state of the corresponding device matches the condition data. If they do not match, the processing proceeds to end step S505 where the state match detection processing and the interrupt are terminated. If a match is determined in step S503, the execution advances to memory write start processing step S504 to initiate memory write start processing. The memory write start processing operation flowchart is identical to that of the third embodiment shown in FIG. 12.

Figure 18:
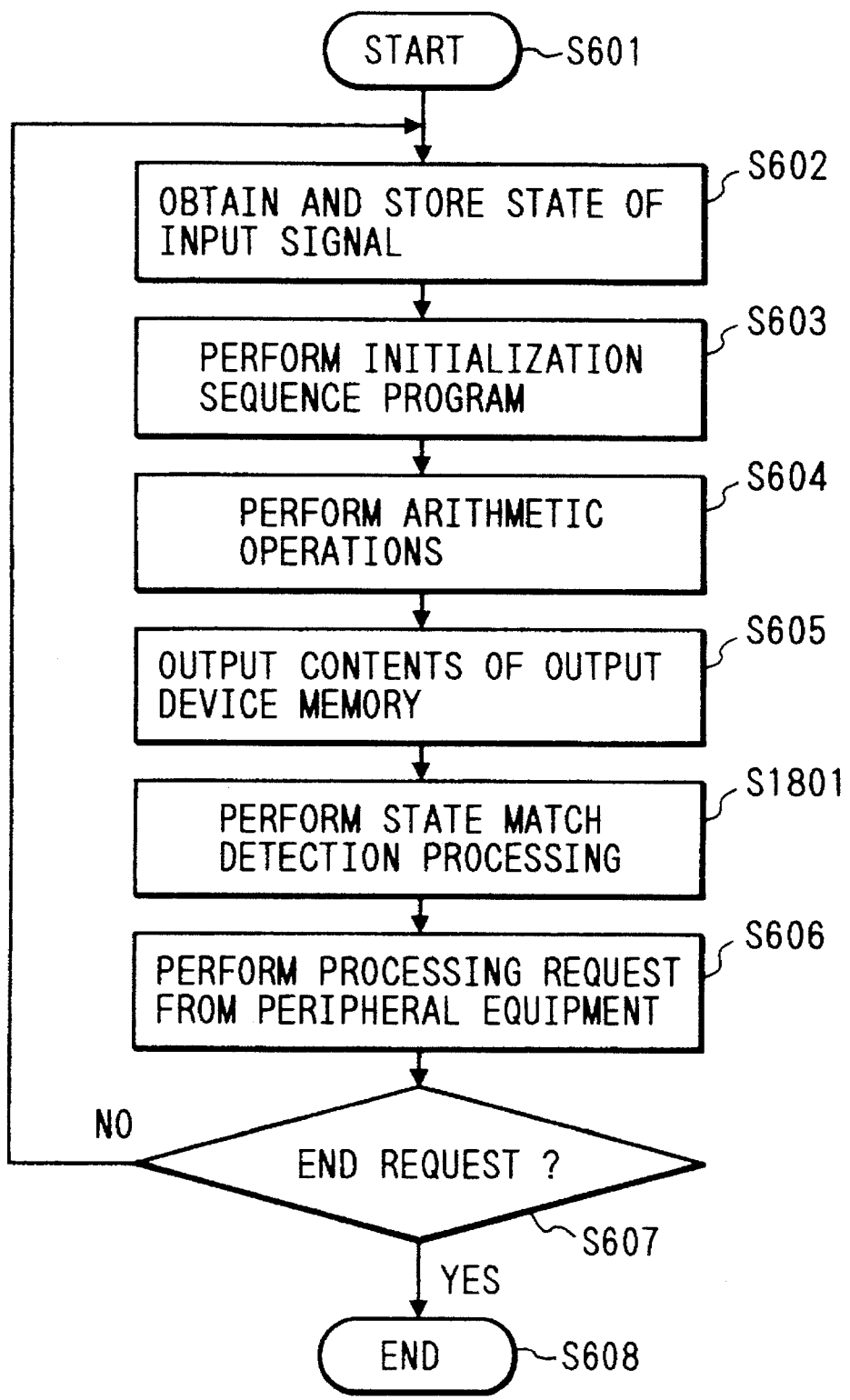
FIG. 18 is a flowchart illustrating an example of the operation of the programmable controller with which the fourth embodiment of the present invention is employed.

Although in the above example, the processing shown in FIG. 17 for detecting the match of the corresponding device contents with the specified data was executed by the interrupt operation generated at each predetermined cycle, such processing may also be performed in step S1801 shown in FIG. 18. That is, FIG. 18 is a flowchart similar to that of the conventional art shown in FIG. 22, however, step S1801 is inserted between and thus performed between steps S605 and S606.

Figure 19:
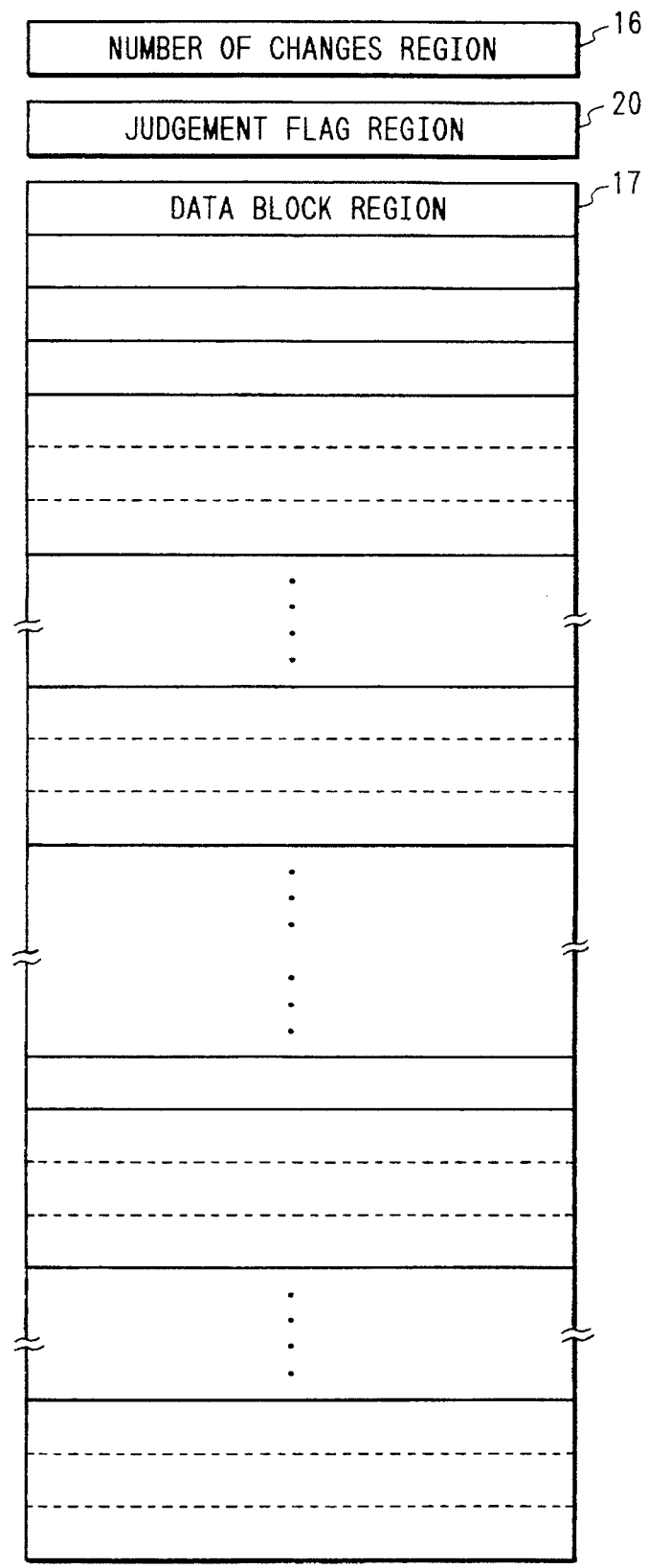
FIG. 19 illustrates an example of data stored in an auxiliary memory of the fourth embodiment shown in FIG. 17.

Further, the contents of the auxiliary memory 1513 may be set as shown in FIG. 19, instead of as shown in FIG. 16, and operation similar to that of the second embodiment, as shown in FIG. 8, can be performed to allow discontinuous addresses to be changed a plurality of times. Namely, in FIG. 8, it could be determined in step S304 whether the condition data matches the state of the corresponding device, instead of whether the change time designation matches the current time.

Further, it should be understood that as shown in FIG. 19, the change time designation data of the second embodiment, as shown in FIG. 7 (first block in data block region 21) has been replaced by data consisting of the device type designation data, the device number designation data and the condition data (first three blocks in data block region 17).

Other features of the embodiments can be interchanged or combined. For example, in the third embodiment, the region 24 shown in FIG. 11 may be arranged to be the region 17 of the first embodiment as shown in FIG. 2. Moreover, in the first embodiment, region 17 as shown in FIG. 2 may be arranged as region 24 of the third or fourth embodiments. Also, in the second embodiment, region 21 in FIG. 7, except for the change time designation in each block, may be arranged like region 24 in the third or fourth embodiments.

Furthermore, the auxiliary memory 613 in the second embodiment, the auxiliary memory 1013 in the third embodiment, and the auxiliary memory 1513 in the fourth embodiment may be an IC memory card such as, for example, the auxiliary memory 113 in the first embodiment.

Figure 20:
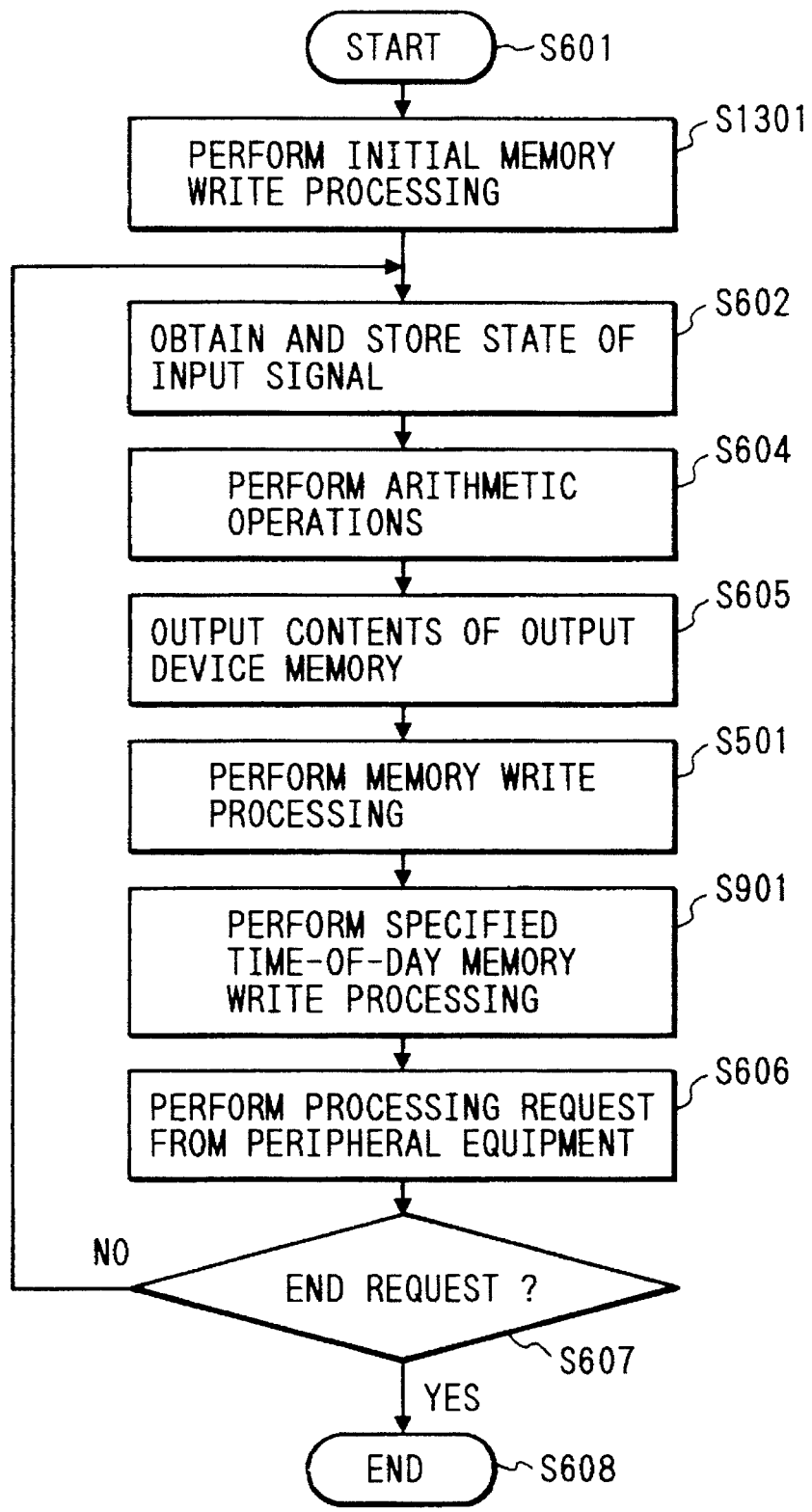
FIG. 20 is an operation flowchart of a programmable controller with which the first, second and third embodiments of the present invention are employed.

FIG. 20 is an operation flowchart of a controller where features of the first, second and third embodiments are implemented simultaneously. The operation shown in FIG. 20 is different from the conventional are operation of FIG. 22 in that step S603 does not exist. Also, step S1301 (FIG. 13) is executed after step S601, and subsequently, the processing proceeds to step S602.

In addition, steps S501 (FIG. 5) and S901 (FIG. 9) have been inserted between steps S605 and S606. If it determined in step S607 that processing is not completed, the processing returns to step S602. Again, note that the operations in steps S1301, S501 and S901 are identical to those in FIGS. 13, 5 and 9, respectively.

Also, note that in the first through fourth embodiments, the new contents of the device memory 12 are stored in the auxiliary memory 113, the auxiliary memory 613, the auxiliary memory 1013 or the auxiliary memory 1513. Hence, the number of data changed may be within the range storable in the auxiliary memory, and the data can also be reused.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A programmable controller which operates based on the contents of a first storage means for storing at least one of input signal states, output signal states, and predetermined internal data, said controller comprising:

second storage means for storing address data corresponding to addresses of said first storage means, write data to be written to said addresses of said first storage means, write data quantity data, and at least one of timing data and cycle designation data;

a determining means for detecting the presence or absence of a task write signal;

means responsive to said task write signal for changing the contents of said first storage means with said write data in accordance with at least one of said cycle designation data and said timing data to perform a program task upon detection of the presence of said task write signal, and for operating said programmable controller with contents of said first storage means to perform processing cycles with at least one of said input states, output signal states, and predetermined internal data in the absence of said task write signal; and counting means for counting a number of data changes performed by said changing means, wherein said changing means ceases operation of said program task when said number equals said write data quantity data.

2. A programmable controller as claimed in claim 1, wherein said means for changing said contents of said first storage means changes said contents at the start of operation of said programmable controller before performing program cycles.

3. A programmable controller as claimed in claim 2, wherein said second storage means sequentially stores a predetermined number of data sets, each data set comprising a portion of both said address data and said write data.

4. A programmable controller as claimed in claim 1, wherein said second storage means sequentially stores a predetermined number of data sets, each data set comprising a portion of both said address data and said write data.

5. A programmable controller as claimed in claim 4, further comprising:

timing means for outputting time data to said changing means; and wherein said changing means changes said contents of said first storage means with said write data stored in said second storage means when said time data approximately equals a predetermined time.

6. A programmable controller as claimed in claim 4, wherein said changing means changes said contents of said first storage means with said write data stored in said second storage means when data stored at a predetermined address of said first storage means represents a predetermined value.

7. A programmable controller as claimed in claim 1, further comprising:

timing means for outputting time data to said changing means; and wherein said changing means changes said contents of said first storage means with said write data when said time data approximately equals a predetermined time.

8. A programmable controller as claimed in claim 1, wherein said changing means changes said contents of said first storage means with said write data stored in said second storage means when data stored at a predetermined address of said first storage means represents a predetermined value.

9. A programmable controller as claimed in claim 1, further comprising a tracking means for tracking a number of process cycles, wherein said changing means changes said contents of said first storage means when said cycle designation data corresponds to said number of process cycles.

10. A programmable controller which operates based on the contents of a first storage means for storing at least one of input signal states, output signal states, and predetermined internal data, said controller comprising:

second storage means for sequentially storing a predetermined number of data blocks, each of said data blocks comprising address data corresponding to first addresses in said first storage means, write data to be written to a predetermined number of addresses of said first storage means beginning at said first addresses, write data quantity data, and at least one of cycle designation data and timing data;

a determining means for detecting the presence of a task write signal;

changing means for reading said data blocks from said second storage means one block at a time and changing said contents of said first storage means sequentially with said address data and said write data of said data blocks in accordance with at least one of said cycle designation data and said timing data to perform a program task upon detection of the presence of said write task signal, and for operating said controller with the contents said first storage means to perform said processing cycles with at least one of said input states, output signal states, and predetermined internal data in the absence of said task write signal; and counting means for counting a number of data changes performed by said changing means, wherein said changing means ceases operation of said program task when said number equals said write data quantity data in the absence of said task write signal.

11. A programmable controller as claimed in claim 10, wherein each of said data blocks comprises a predetermined number of data sets, each data block comprising a portion of both said address data and said write data.

12. A programmable controller as claimed in claim 11, further comprising:
   timing means for outputting time data to said changing means; and
   wherein said changing means reads said data blocks from second storage means one block at a time and changes said contents of said first storage means in accordance with said read data blocks when said time data approximately equals any of a plurality of predetermined times.

13. A programmable controller as claimed in claim 11, wherein said changing means, reads said data blocks from said second storage means one block at a time and changes said storage contents of the first storage means with said read data blocks when data stored at a predetermined address of said first storage means indicates any one of a plurality of predetermined values.

14. A programmable controller as claimed in claim 10, further comprising:
   timing means for outputting time data to said changing means; and
   wherein said changing means reads said data blocks from second storage means one block at a time and changes said contents of said first storage means with said read data blocks when said time data approximately equals any of a plurality of predetermined times.

15. A programmable controller as claimed in claim 10, wherein said changing means reads said data blocks from said second storage means one block at a time and changes said storage contents of the first storage means with said read data blocks when data stored at a predetermined address of said first storage means indicates any one of a plurality of predetermined values.

16. A method for operating a programmable controller based on the contents of a first storage means for storing at least one of input signal states, output signal states, and predetermined internal data, and having a second storage means for storing address data corresponding to addresses of said first storage means, write data, and at least one of: cycle designation data and timing data, wherein said method comprises the steps of:
   detecting the presence or absence of a write task signal;
   performing processing cycles based on at least one of said input signal states, output signal states, and predetermined internal data in the absence of said write task signal;
   inputting data from said second storage means to said first storage means upon detection of the presence of said write task signal;
   determining write data quantity data based on the contents of said second storage means;
   changing said contents of said first storage means in accordance with said address data and write data after detection of the presence of said write task signal based upon at least one of said cycle designation data and said timing data;
   counting a number of data written from said second storage means to said first storage means; and
   returning the program controller to performing said processing cycles when said number of written data equals said write data quantity data.

17. A programmable controller operating method as claimed in claim 16, wherein said changing step changes said contents of said first storage means at the start of operation of said programmable controller before performing processing cycles.

18. A programmable controller operating method as claimed in claim 17, wherein said inputting step inputs said address data and said write data as a predetermined number of data sets, each data set comprising a portion of both said address data and said write data.

19. A programmable controller operating method as claimed in claim 16, wherein said inputting step inputs said address data and said write data as a predetermined number of data sets, each data set comprising a portion of both said address data and said write data.

20. A programmable controller operating method claimed in claim 19 further comprising the step of starting a time signal before said write task signal detecting step, wherein said changing step changes said contents of said first storage means with said address and write data of said second storage means upon the occurrence of at least one of: detection of the presence of said with task signal and when said time signal substantially equals a predetermined time.

21. A programmable controller operating method as defined in claim 19, wherein said changing step changes said contents of said first storage means with said address and write data of said second storage means when data stored at a predetermined address of said first storage means represents a predetermined value.

22. A programmable controller operating method claimed in claim 16, further comprising the step of starting a time signal before said write task signal detecting step, wherein said changing step changes said contents of said first storage means with said address and write data of said second storage means upon the occurrence of at least one of: detection of the presence of said write task signal and said time signal substantially equals a predetermined time.

23. A programmable controller operating method as defined in claim 16, wherein said changing step changes said contents of said first storage means with said address and write data of said second storage means when data stored at a predetermined address of said first storage means represents a predetermined value.

24. A method for operating a programmable controller according to claim 16 further comprising the step of starting a process cycle count, wherein said changing step changes said contents of said first storage means with said address and write data of said second storage means when said cycle count equals said cycle designation data.

25. A method for operating a programmable controller based on the contents of a first storage means for storing input signal states, output signal states, and predetermined internal data, and having a second storage means for storing address data corresponding to addresses of said first storage means, write data, and write data quantity data and at least one of: cycle designation data and timing data, wherein said method comprises the steps of:
   detecting the presence or absence a write task signal;
   performing processing cycles based on at least one of said input states, output states, and predetermined internal data in the absence of said write task signal;
   sequentially inputting a predetermined number of data blocks from said second storage means, each of said data blocks comprising address data corresponding to a first addresses of said first storage means and write data to be written to a predetermined number of addresses of said first storage means beginning at said first address upon detection of the presence of said write task signal;

reading said data blocks from said second storage means one block at a time after detection of the presence of said write task signal;

determining write data quantity data based on the contents of said second storage means;

changing said contents of said first storage means sequentially in accordance with said address data and said write data of said read data blocks after detection of the presence of said write task signal based upon said write data quantity data and at least one of said cycle designation data and said timing data;

counting a number of data written from said second storage means to said first storage means; and returning the program controller to performing said processing cycles when said number of data equals said write data quantity data.

26. A programmable controller operating method as claimed in claim 25, wherein each of said data blocks comprises a predetermined number of information sets, each data block comprising a portion of both said address data and said write data.

27. A programmable controller operating method as defined in claim 26, further comprising the step of starting a time signal before said write task signal detecting step wherein said reading step reads any of said blocks and said changing step changes said contents of said first storage means with said address and write data of said second storage means upon the occurrence of at least one of: detection of the presence of said write task signal and when said time signal substantially corresponds to any one of a plurality of predetermined times.

28. A programmable controller operating method as claimed in claim 26, wherein said reading step reads any of said blocks and said changing step changes said contents of said first storage means when data stored at a predetermined address of said first storage means represents any of a plurality of predetermined values.

29. A programmable controller operating method as defined in claim 25, further comprising the step of starting a time signal before said write task signal detecting step wherein said reading step reads any of said blocks and said changing step changes said contents of said first storage means with said address and write data of said second storage means upon the occurrence of at least one of: detection of the presence of said write task signal and when said time signal substantially corresponds to any one of a plurality of predetermined times.

30. A programmable controller operating method as claimed in claim 25, wherein said reading step reads any of said blocks and said changing step changes said contents of said first storage means when data stored at a predetermined address of said first storage means represents any of a plurality of predetermined values.

* * * * *